US012045095B2

(12) United States Patent
Hwang et al.

(10) Patent No.: US 12,045,095 B2
(45) Date of Patent: Jul. 23, 2024

(54) WINDOW AND ELECTRONIC DEVICE INCLUDING THE SAME

(71) Applicant: Samsung Display Co., Ltd., Yongin-si (KR)

(72) Inventors: Seongjin Hwang, Suwon-si (KR); Kyung-Man Kim, Anyang-si (KR); Dawoon Kim, Yongin-si (KR); Sanghoon Kim, Hwaseong-si (KR); Sunghoon Kim, Hwaseong-si (KR); Seungho Kim, Asan-si (KR); Yuri Kim, Guri-si (KR); Min-Hoon Choi, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/888,893

(22) Filed: Aug. 16, 2022

(65) Prior Publication Data

US 2023/0140591 A1 May 4, 2023

(30) Foreign Application Priority Data

Nov. 1, 2021 (KR) .................. 10-2021-0148158

(51) Int. Cl.
*G06F 1/16* (2006.01)

(52) U.S. Cl.
CPC .......... *G06F 1/1656* (2013.01); *G06F 1/1616* (2013.01)

(58) Field of Classification Search
CPC .... G06F 1/1652; G06F 1/1641; G06F 1/1616; G06F 2203/04103
See application file for complete search history.

(56) References Cited

U.S. PATENT DOCUMENTS 10,020,462 B1  7/2018  Ai et al.
10,198,041 B2*  2/2019  Myeong ............... G06F 1/1681
(Continued)

FOREIGN PATENT DOCUMENTS

KR  1020180053483 A  5/2018
KR  1020180079093 A  7/2018
(Continued)

OTHER PUBLICATIONS

Yung-Cheng "Y. C." Lee et al., A Review on United States Patents to Prevent Mechanical Failures in Foldable Smartphones, Journal of Electronic Packaging Jun. 2021, vol. 143 / pp. 020802-1-020802-16.

*Primary Examiner* — James Wu
*Assistant Examiner* — Dakota M Talbert
(74) *Attorney, Agent, or Firm* — CANTOR COLBURN LLP

(57) ABSTRACT

A window includes a folding portion foldable with respect to an imaginary folding axis extending in a first direction, a first non-folding portion, and a second non-folding portion spaced apart from the first non-folding portion in a second direction perpendicular to the first direction with the folding portion interposed therebetween. The folding portion includes a base portion and a plurality of protrusion portions disposed on the base portion and spaced apart from each other in the second direction. A width, in the first direction, of the folding portion is smaller than a width, in the first direction, of each of the first non-folding portion and the second non-folding portion.

20 Claims, 24 Drawing Sheets

(56) References Cited

U.S. PATENT DOCUMENTS

| | | | |
|---|---|---|---|
| 10,216,230 | B2 | 2/2019 | Kim et al. |
| 10,461,274 | B2 | 10/2019 | Kim |
| 2018/0138442 | A1 | 5/2018 | Kim |
| 2018/0155238 | A1 | 6/2018 | Kim et al. |
| 2020/0292731 | A1 | 9/2020 | Park et al. |
| 2022/0011813 | A1* | 1/2022 | Kim ............... G06F 1/1656 |

FOREIGN PATENT DOCUMENTS

| | | |
|---|---|---|
| KR | 102068685 B1 | 1/2020 |
| KR | 102264276 B1 | 6/2021 |

* cited by examiner

WINDOW AND ELECTRONIC DEVICE INCLUDING THE SAME

This application claims priority to Korean Patent Application No. 10-2021-0148158, filed on Nov. 1, 2021, and all the benefits accruing therefrom under 35 U.S.C. § 119, the content of which in its entirety is herein incorporated by reference.

BACKGROUND

1. Field

Embodiments of the invention relate to a window and an electronic device including the same. More particularly, embodiments of the invention relate to a foldable window and an electronic device including the foldable window.

2. Description of the Related Art

Various types of electronic devices are being used to provide image information, and recently, electronic devices including a flexible display panel that is foldable or bendable are being developed. Different from a rigid electronic device, a flexible electronic device is foldable, rollable, or bendable. Since a shape of the flexible electronic device is changed in various ways, it is able to carry the flexible electronic device regardless of the size of its screen that displays images.

The flexible electronic device typically includes a window that desirably protects the display panel without causing disruption to the folding or bending operation, and accordingly, it is desired to develop a window having excellent folding characteristics without deteriorating mechanical properties.

SUMMARY

Embodiments of the invention provide a window having excellent folding characteristics and mechanical properties.

Embodiments of the invention provide an electronic device including the window having excellent folding characteristics and improved impact resistance against external impacts.

An embodiment of the invention provides a window including a folding portion foldable with respect to an imaginary folding axis extending in a first direction, a first non-folding portion, and a second non-folding portion spaced apart from the first non-folding portion in a second direction perpendicular to the first direction with the folding portion interposed therebetween. The folding portion includes a base portion and a plurality of protrusion portions disposed on the base portion and spaced apart from each other in the second direction. A width, in the first direction, of the folding portion is smaller than a width, in the first direction, of each of the first non-folding portion and the second non-folding portion.

In an embodiment, each of the plurality of protrusion portions may include a protrusion edge portion substantially parallel to the second direction, each of the first non-folding portion and the second non-folding portion includes a non-folding edge portion substantially parallel to the second direction, and the protrusion edge portion is disposed further inward than the non-folding edge portion.

In an embodiment, a distance, in the first direction, between the non-folding edge portion and the protrusion edge portion may be equal to or greater than about 0.5 millimeter (mm) and equal to or smaller than about 100 mm.

In an embodiment, an absolute value of a difference between the width, in the first direction, of the folding portion and the width, in the first direction, of each of the first non-folding portion and the second non-folding portion may be equal to or greater than about 1 mm and equal to or smaller than about 100 mm.

In an embodiment, a concave portion may be defined in a portion corresponding to the folding portion by an edge of the folding portion, an edge of the first non-folding portion adjacent to the folding portion, and an edge of the second non-folding portion adjacent to the folding portion in a plan view, the concave portion may be concaved in an inward direction, and the concave portion may include corners adjacent to the first non-folding portion and the second non-folding portion and having a right angle shape, a U shape, or a V shape.

In an embodiment, a radius of curvature of the corners of the concave portion adjacent to the first non-folding portion and the second non-folding portion may be equal to or greater than about 0.1 mm and equal to or smaller than about 2.0 mm when the concave portion has the U shape.

In an embodiment, a maximum width, in the first direction, of the concave portion may be equal to or greater than about 0.5 mm and equal to or smaller than about 50 mm. In an embodiment, a width, in the second direction, of the concave portion may be equal to or greater than about $0.5\pi$ mm and equal to or smaller than about 20 mm.

In an embodiment, each of the plurality of protrusion portions may include a protrusion upper surface portion, a protrusion lower surface portion facing the protrusion upper surface portion, and a protrusion edge portion disposed between the protrusion upper surface portion and the protrusion lower surface portion, including a portion perpendicular to the protrusion upper surface portion and the protrusion lower surface portion, and substantially parallel to the second direction.

In an embodiment, the protrusion edge portion may include a protrusion vertical portion adjacent to the protrusion lower surface portion and perpendicular to the protrusion lower surface portion and a protrusion slant portion disposed between the protrusion vertical portion and the protrusion upper surface portion and slanted from the protrusion upper surface portion to the protrusion vertical portion.

In an embodiment, the protrusion edge portion may include a protrusion vertical portion adjacent to the protrusion lower surface portion and perpendicular to the protrusion lower surface portion and a protrusion curved surface portion including a curved surface disposed between the protrusion vertical portion and the protrusion upper surface portion and outwardly convexed with respect to a protrusion portion of the plurality of protrusion portions.

In an embodiment, each of the first non-folding portion and the second non-folding portion may include a non-folding upper surface portion, a non-folding lower surface portion facing the non-folding upper surface portion, and a non-folding edge portion disposed between the non-folding upper surface portion and the non-folding lower surface portion, including a portion perpendicular to the non-folding upper surface portion and the non-folding lower surface portion, and substantially parallel to the second direction.

In an embodiment, the non-folding edge portion may include a non-folding vertical portion adjacent to the non-folding lower surface portion and perpendicular to the non-folding lower surface portion and a non-folding slant portion disposed between the non-folding vertical portion and the non-folding upper surface portion and slanted from the non-folding upper surface portion to the non-folding vertical portion.

In an embodiment, the non-folding edge portion may include a non-folding vertical portion adjacent to the non-folding lower surface portion and perpendicular to the non-folding lower surface portion and a non-folding curved surface portion disposed between the non-folding upper surface portion and the non-folding vertical portion and including a curved surface outwardly convexed with respect to at least one of the first and second non-folding portions.

In an embodiment, the window may further include a protrusion protective layer. Each of the plurality of protrusion portions may include a protrusion edge portion substantially parallel to the second direction, and the protrusion protective layer may be filled in between the plurality of protrusion portions and covers the protrusion edge portion.

In an embodiment, the base portion may include a protrusion area that overlaps the plurality of protrusion portions and a non-protrusion area that does not overlap the plurality of protrusion portions, the non-protrusion area may be disposed further outward than the protrusion area, and the protrusion protective layer may cover the non-protrusion area.

In an embodiment, the protrusion protective layer may cover an entirety of the plurality of protrusion portions.

An embodiment of the invention provides an electronic device including a display module including a folding display portion foldable with respect to an imaginary folding axis extending in a first direction, a first non-folding display portion, and a second non-folding display portion spaced apart from the first non-folding display portion in a second direction perpendicular to the first direction with the folding display portion interposed therebetween and a window disposed on the display module and including a folding portion corresponding to the folding display portion, a first non-folding portion, and a second non-folding portion spaced apart from the first non-folding portion with the folding portion interposed therebetween. The folding portion includes a base portion and a plurality of protrusion portions disposed on the base portion and spaced apart from each other in the second direction. A width, in the first direction, of the folding portion is smaller than a width, in the first direction, of each of the first non-folding portion and the second non-folding portion.

In an embodiment, the base portion of the window may be disposed adjacent to the display module.

In an embodiment, the plurality of protrusion portions of the window may be disposed adjacent to the display module.

According to the above, as the window includes the folding portion that is patterned and the folding portion has the width that is smaller than the width of the non-folding portion, the window has excellent folding characteristics and impact resistance.

In addition, the electronic device includes the window that is disposed on the display module and includes the patterned folding portion whose width is smaller than the width of the non-folding portion. Accordingly, electronic device has excellent folding characteristics and mechanical properties.

BRIEF DESCRIPTION OF THE DRAWINGS

The above and other advantages of the invention will become readily apparent by reference to the following detailed description when considered in conjunction with the accompanying drawings wherein.

DETAILED DESCRIPTION

Figure 1A:
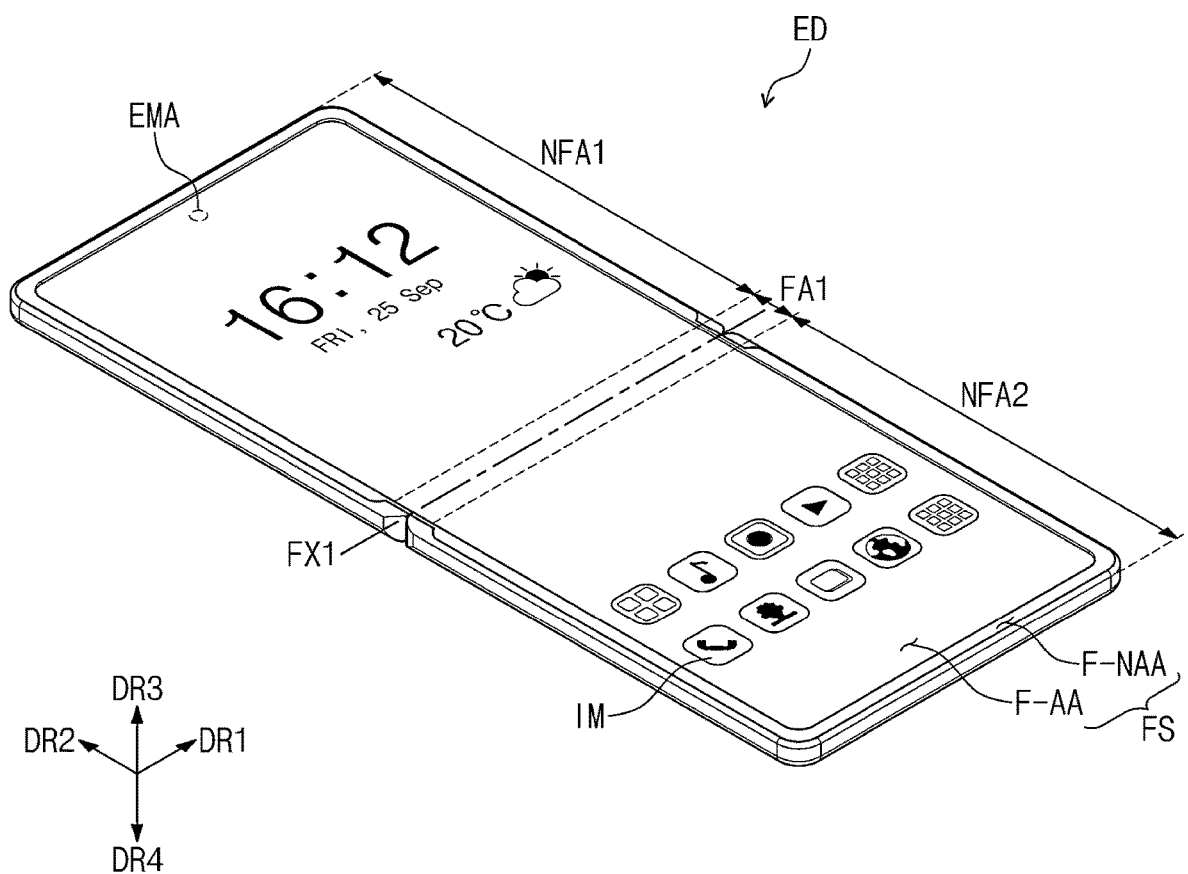
FIG. 1A is a perspective view of an embodiment of an electronic device in an unfolded state according to the invention.

Embodiments of the invention may be variously modified and realized in many different forms, and thus embodiments will be exemplified in the drawings and described in detail hereinbelow. However, the invention should not be limited to the disclosed forms, and be construed to include all modifications, equivalents, or replacements included in the spirit and scope of the invention.

It will be understood that when an element (or area, layer, or portion) is referred to as being "on", "connected to" or "coupled to" another element or layer, it can be directly on, connected or coupled to the other element or layer or intervening elements or layers may be present.

In the disclosure, the expression "directly disposed" means that no intervening element, such as layer, film, area, or plate, between the element and other elements. The expression "directly disposed" means that two layers or two members are disposed with no additional member such as an adhesive member therebetween, for example.

Like numerals refer to like elements throughout. In the drawings, the thickness, ratio, and dimension of components are exaggerated for effective description of the technical content.

As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the teachings of the disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as illustrated in the drawing figures. In addition, the term "on" in the disclosure may mean that a portion of an element is disposed at a lower portion as well as an upper portion of another element.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms used herein, including technical or scientific terms, have the same meanings as those generally understood by those skilled in the art to which the disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the application.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, a window and an electronic device according to the invention will be explained in detail with reference to the accompanying drawings.

Figure 1B:
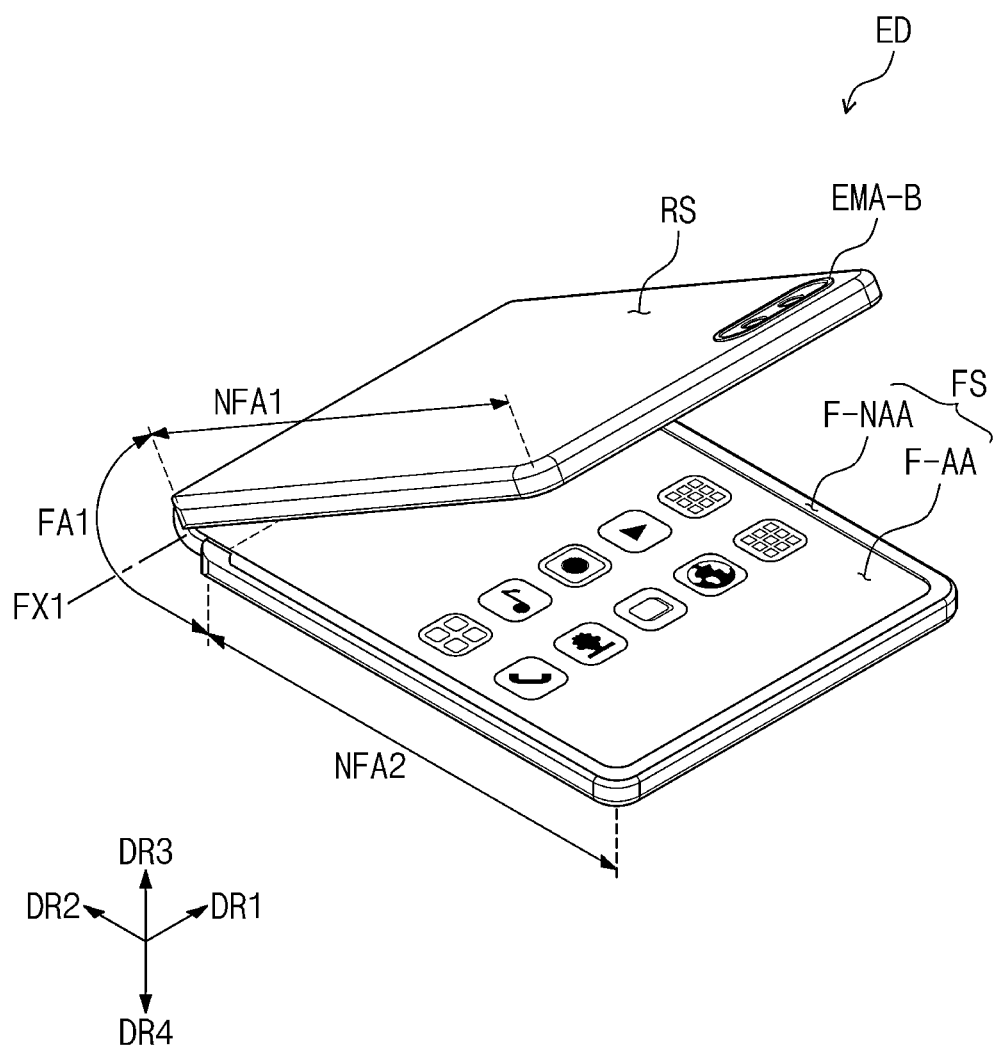
FIG. 1B is a perspective view of an embodiment of the electronic device of FIG. 1A which is being inwardly folded according to the invention.

FIG. 1A is a perspective view of an embodiment of an electronic device ED in an unfolded state according to the invention. FIG. 1B is a perspective view of an embodiment of the electronic device ED of FIG. 1A which is being inwardly folded according to the invention. The electronic device ED may be a device that is activated in response to electrical signals. In an embodiment, the electronic device ED may be a mobile phone, a tablet computer, a car navigation unit, a game unit, or a wearable device, however, it should not be limited thereto or thereby. FIG. 1A shows the mobile phone as an illustrative embodiment of the electronic device ED.

FIG. 1A and the following drawings show first, second, third, and fourth directional axes DR1, DR2, DR3, and DR4, and directions indicated by the first, second, third, and fourth directional axes DR1, DR2, DR3, and DR4 may be relative to each other and may be changed to other directions. In addition, the directions indicated by the first, second, third, and fourth directional axes DR1, DR2, DR3, and DR4 may be also referred to as first, second, third, and fourth directions, respectively, and may be assigned with the same reference numerals as those of the first, second, third, and fourth directional axes DR1, DR2, DR3, and DR4.

Referring to FIGS. 1A and 1B, the electronic device ED may include a display surface FS defined by the first directional axis DR1 and the second directional axis DR2 crossing the first directional axis DR1. The electronic device ED may provide an image IM through the display surface FS to a user. In an embodiment, the electronic device ED may display the image IM through the display surface FS toward the third directional axis DR3, which is substantially perpendicular to each of the first directional axis DR1 and the second directional axis DR2. In the illustrated embodiment, front (or upper) and rear (or lower) surfaces of each member of the electronic device ED may be defined with respect to a direction in which the image IM is displayed. In the disclosure, the direction in which the image IM is displayed may be also referred to as the third directional axis DR3, and the fourth directional axis DR4 may be defined as a direction opposite to the direction indicated by the third directional axis DR3.

The electronic device ED may sense an external input applied thereto from the outside. The external input may include inputs of various forms provided from the outside of the electronic device ED. In an embodiment, the external input may include external inputs applied when approaching close to or in proximity to the electronic device ED at a predetermined distance (e.g., a hovering input) as well as a touch input by a body of a user, e.g., a hand of the user, for example. In addition, the external input may include various forms, such as force, pressure, temperature, or light.

The display surface FS of the electronic device ED may include an active area F-AA and a peripheral area F-NAA. The active area F-AA may be activated in response to the electrical signals. The electronic device ED may display the image IM through the active area F-AA, and various external inputs may be sensed through the active area F-AA. The peripheral area F-NAA may be defined adjacent to the active area F-AA. The peripheral area F-NAA may have a predetermined color. The peripheral area F-NAA may surround the active area F-AA. Accordingly, the active area F-AA may have a shape that is substantially defined by the peripheral area F-NAA, however, this is merely one of embodiments. The peripheral area F-NAA may be defined adjacent to only one side of the active area F-AA or may be omitted. In an embodiment, the active area of the electronic device ED may have a variety of shapes, and it should not be particularly limited.

The electronic device ED may include a folding area FA1 and non-folding areas NFA1 and NFA2. The electronic device ED may include a plurality of non-folding areas NFA1 and NFA2. The electronic device ED may include a first non-folding area NFA1 and a second non-folding area NFA2 spaced apart from the first non-folding area NFA1 with the folding area FA1 interposed therebetween. FIGS. 1A and 1B show the electronic device ED including one folding area FA1 as an illustrative embodiment, however, the electronic device ED should not be limited thereto or thereby. In an embodiment, the electronic device ED may include a plurality of folding areas.

Referring to FIG. 1B, the electronic device ED may be folded with respect to a first folding axis FX1. In the description, the term "folding axis" may be also referred to as an imaginary folding axis. The first folding axis FX1 may be an imaginary axis extending in the first directional axis DR1, and the first folding axis FX1 may be substantially parallel to a short side direction of the electronic device ED. The first folding axis FX1 may extend along the first directional axis DR1 on the display surface FS.

In an embodiment, the non-folding areas NFA1 and NFA2 may be disposed adjacent to the folding area FA1 with the folding area FA1 interposed between the non-folding areas NFA1 and NFA2. In an embodiment, the first non-folding area NFA1 may be disposed adjacent to one side of the folding area FA1 in the second direction DR2, and the second non-folding area NFA2 may be disposed adjacent to an opposite side of the folding area FA1 in the second direction DR2.

The electronic device ED may be folded with respect to the first folding axis FX1 and may be in an inwardly folded (in-folding) state in which an area overlapping the first non-folding area NFA1 of the display surface FS faces an area overlapping the second non-folding area NFA2.

However, the invention should not be limited thereto or thereby. In an embodiment, the electronic device may be folded about a plurality of folding axes to allow portions of the display surface FS to face each other, and the number of the folding axes and the number of the non-folding areas should not be particularly limited.

In an embodiment, the active area F-AA may include an electronic module area EMA. Various electronic modules may be disposed in the electronic module area EMA. In an embodiment, the electronic modules may include at least one of a camera, a speaker, an optical sensor, and a heat sensor. An external object may be sensed through the electronic module area EMA of the display surface FS, or a sound signal, such as a voice, may be provided to the outside through the electronic module area EMA of the display surface FS. The electronic module may include a plurality of components, however, it should not be limited to a particular embodiment.

The electronic module area EMA may be surrounded by the active area F-AA and the peripheral area F-NAA, however, it should not be limited thereto or thereby. The electronic module area EMA may be defined in the active area F-AA, and the electronic module area EMA should not be particularly limited.

In addition, the electronic device ED may further include an electronic module area EMA-B defined in a rear surface RS of the electronic device ED. Various electronic modules, such as a camera, a speaker, an optical sensor, and a heat sensor, may be disposed in the electronic module area EMA-B defined in the rear surface RS.

Figure 1C:
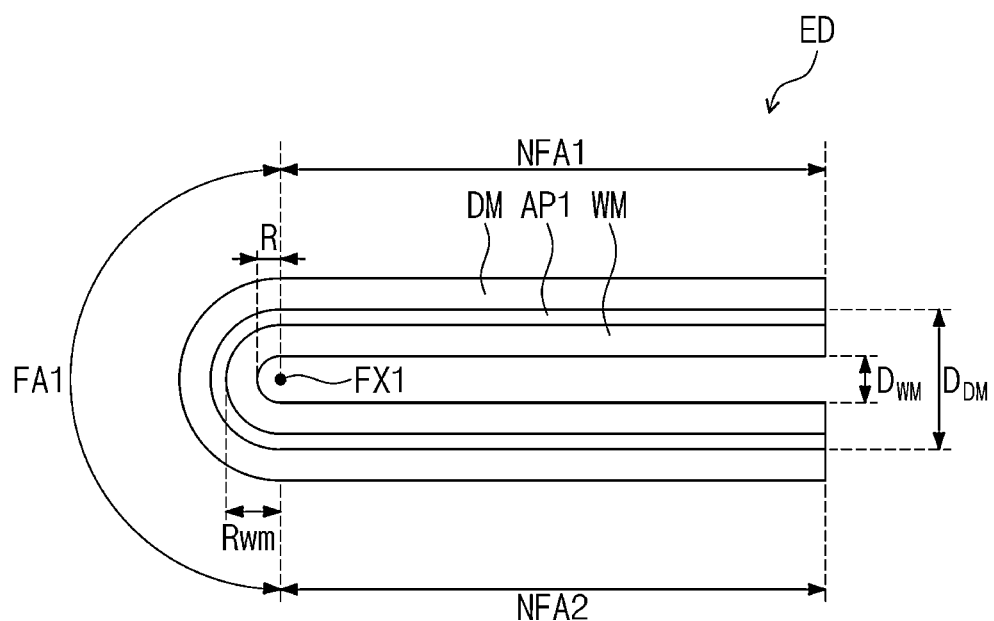
FIG. 1C is a cross-sectional view of an embodiment of an electronic device in a folded state according to the invention.
Figure 1C:
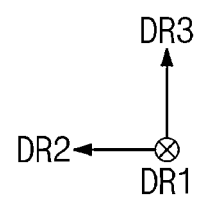

FIG. 1C is a cross-sectional view of an embodiment of the electronic device ED in a folded state according to the invention. In the folded state of the electronic device ED, a distance $DPP_{WM}$ between portions of an upper surface of a window WM, which face each other, may be smaller than a distance $DP_{DM}$ between portions of an upper surface of a display module DM, which face each other. A radius of curvature R of the folding area FA1 of the electronic device ED with respect to the first folding axis FX1 may be equal to or greater than about 1 millimeter (mm). An area of the window WM corresponding to the folding area FA1 may have a radius of curvature $R_{WM}$ equal to or greater than about 0.1 mm and equal to or smaller than about 2.0 mm with respect to the first folding axis FX1. In an embodiment, an adhesive layer AP1 may be disposed between the window WM and the display module.

Figure 2A:
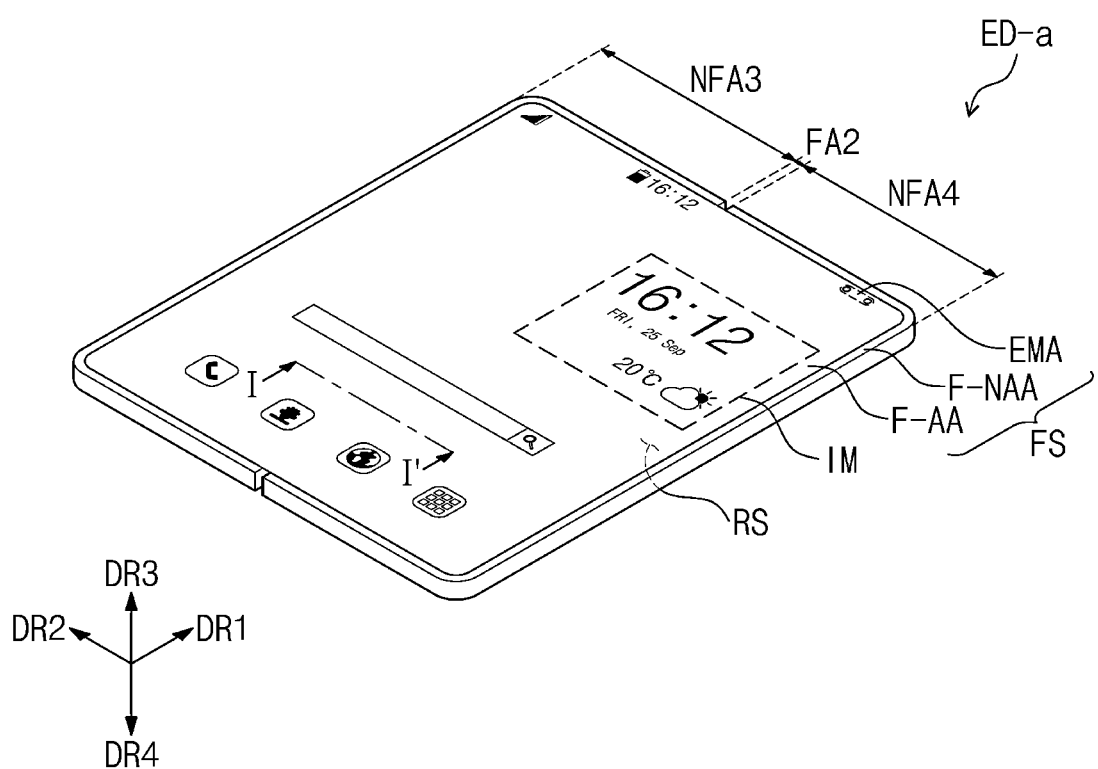
FIG. 2A is a perspective view of an embodiment of a display device in an unfolded state according to the invention.
Figure 2B:
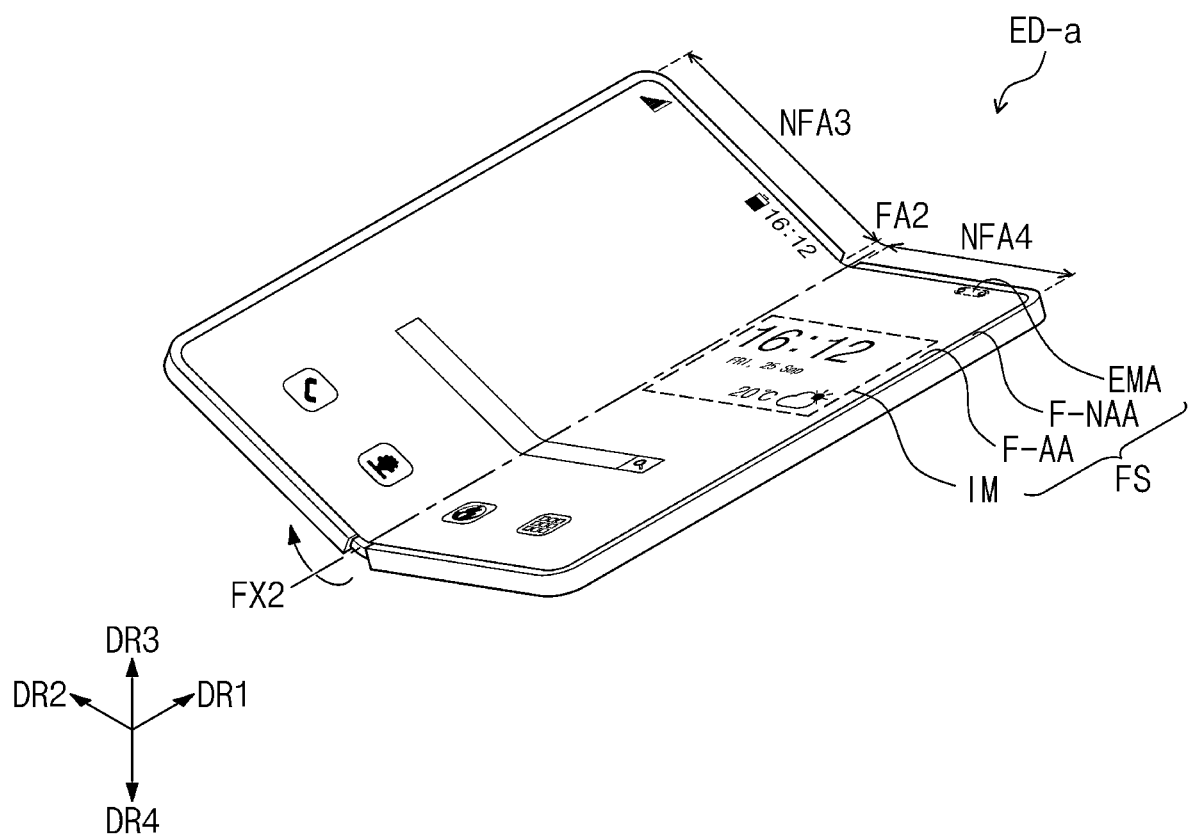
FIG. 2B is a perspective view of an embodiment of the display device of FIG. 2A which is being inwardly folded according to the invention.
Figure 2C:
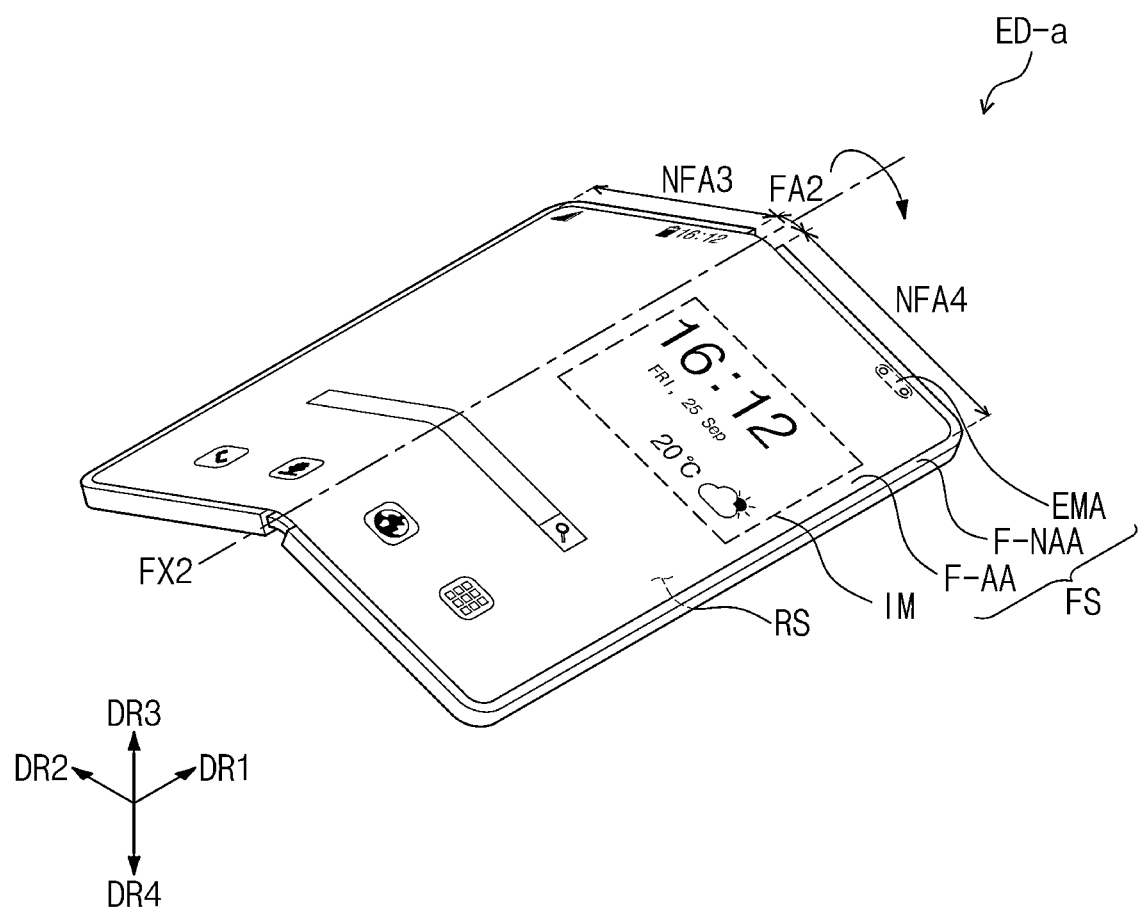
FIG. 2C is a perspective view of an embodiment of the display device of FIG. 2A which is being outwardly folded according to the invention.

FIG. 2A is a perspective view of an embodiment of a display device ED-a in an unfolded state according to the invention. FIG. 2B is a perspective view of an embodiment of the display device ED-a of FIG. 2A which is being inwardly folded according to the invention. FIG. 2C is a perspective view of an embodiment of the display device ED-a of FIG. 2A which is being outwardly folded according to the invention.

The display device ED-a may include at least one folding area FA2 and non-folding areas NFA3 and NFA4 defined adjacent to the folding area FA2. The non-folding areas NFA3 and NFA4 may be spaced apart from each other with the folding area FA2 interposed therebetween.

The folding area FA2 may have a predetermined curvature and a radius of curvature with reference to a second folding axis FX2. In an embodiment, the display device ED-a may be inwardly folded (in-folding) such that a first non-folding area NFA3 and a second non-folding area NFA4 may face each other and a first display surface FS may not be exposed to the outside.

In addition, different from the display device ED-a shown in FIGS. 2A and 2B, the display device ED-a may be outwardly folded (out-folding) such that the first display surface FS may be exposed to the outside. The first display surface FS may be viewed by the user in the unfolded state of the display device ED-a, and a second display surface RS may be viewed by the user in the inwardly folded state. The first display surface FS may include an electronic module area EMA in which an electronic module including various components is disposed.

In an embodiment, the display device ED-a may include the second display surface RS, and the second display surface RS may be defined as a surface opposite to at least a portion of the first display surface FS. In the inwardly folded (in-folding) state of the display device ED-a, the second display surface RS may be viewed by the user. The second display surface RS may include the electronic module area EMA in which the electronic module including various components is disposed. In an embodiment, the image may be provided through the second display surface RS.

The display devices ED and ED-a may repeat the unfolding operation and the in-folding operation or to repeat the unfolding operation and the out-folding operation, however, the invention should not be limited thereto or thereby. In an embodiment, the display devices ED and ED-a may be selectively operated in any one of the unfolding operation, the in-folding operation, and the out-folding operation. Also, although the folding axis extending in the first direction DR1 parallel to a short side of the display device ED or a long side of the display device ED-a is illustrated, the invention is not limited thereto, and the display device may be foldable along a folding axis extending in at least one of various other directions.

Figure 3:
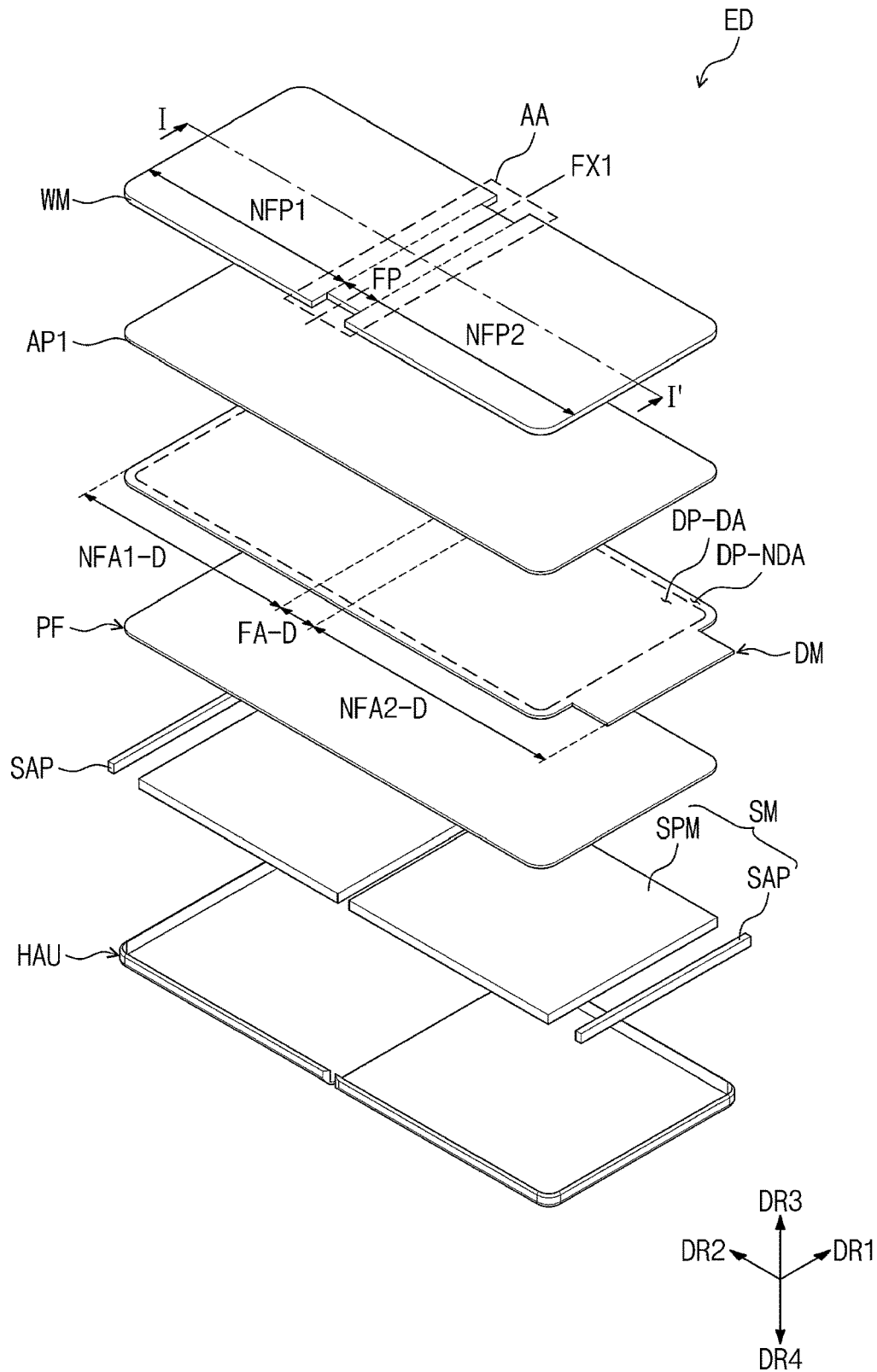
FIG. 3 is an exploded perspective view of an embodiment of an electronic device according to the invention.
Figure 4A:
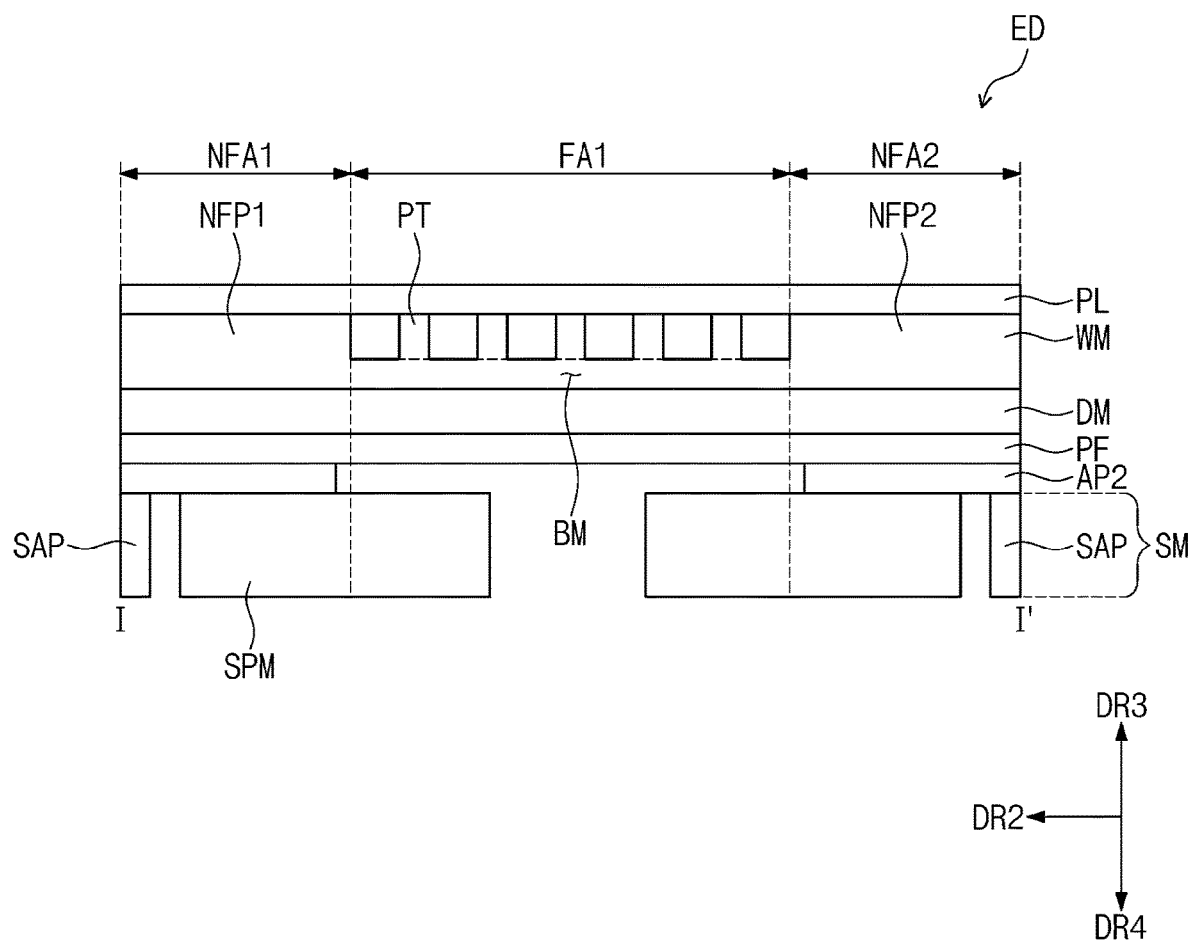
FIG. 4A is a cross-sectional view of an embodiment of an electronic device according to the invention.
Figure 4B:
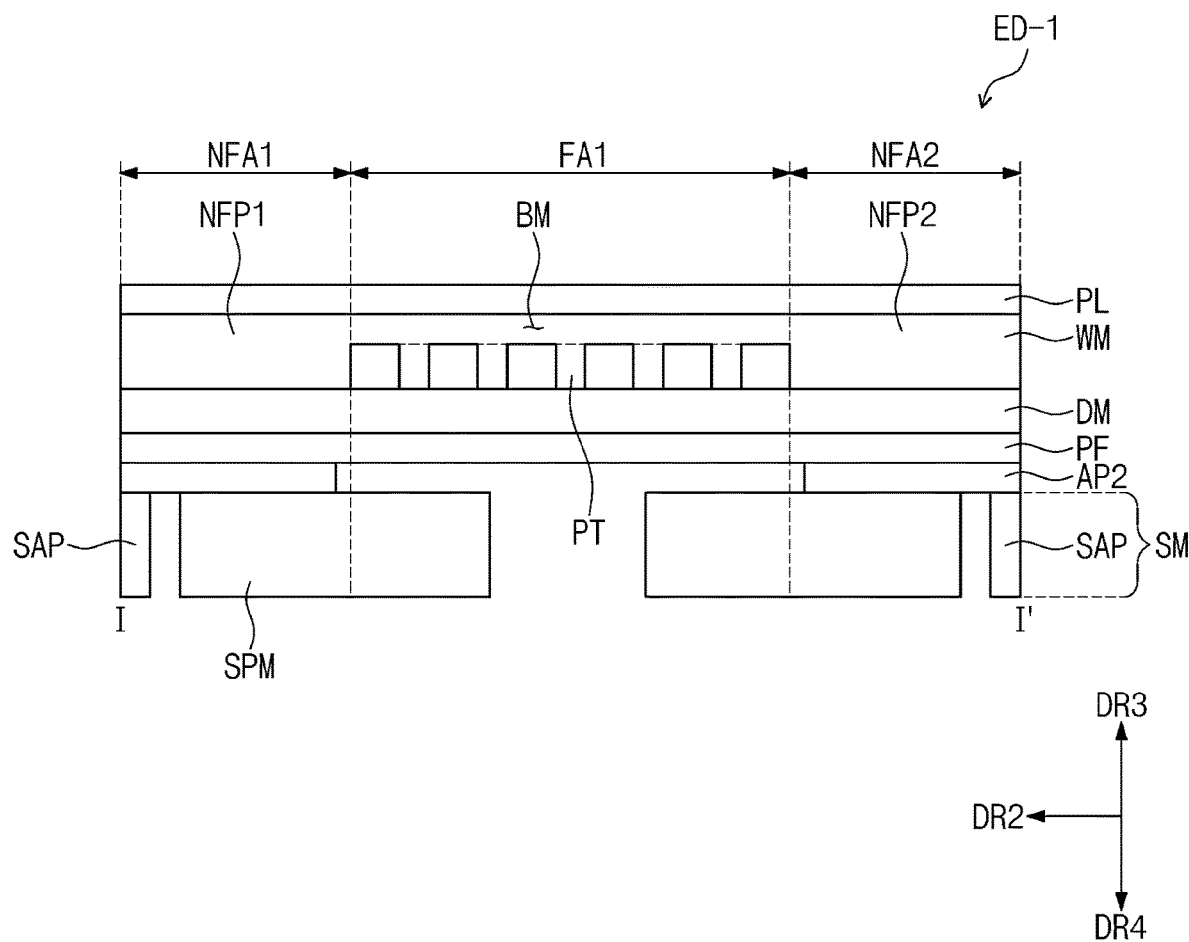
FIG. 4B is a cross-sectional view of an embodiment of an electronic device according to the invention.

FIG. 3 is an exploded perspective view of an embodiment of the electronic device ED according to the invention. FIGS. 4A and 4B are cross-sectional views of an embodiment of electronic devices ED and ED-1 according to the invention. FIG. 3 is an exploded perspective view of the electronic device ED shown in FIG. 1A. FIGS. 4A and 4B are cross-sectional views taken along line I-I' of FIG. 3.

Referring to FIGS. 3 and 4A, the electronic device ED may include the display module DM and the window WM disposed on the display module DM. In an embodiment, the electronic device ED may further include an upper protective layer PL disposed on the window WM. The electronic device ED may include a lower module SM and a lower protective layer PF, which are disposed under the display module DM.

The window WM may cover an entirety of an outer surface of the display module DM. The window WM may have a shape corresponding to a shape of the display module DM. In addition, the electronic device ED may include a housing HAU accommodating the display module DM and the lower module SM. The housing HAU may be coupled with the window WM. Although not shown in drawing figures, the housing HAU may further include a hinge structure to allow the electronic device ED to be easily folded or bent.

In an embodiment, the window WM of the electronic device ED may include an optically transparent insulating material. The window WM may be, but not limited to, a glass substrate or a polymer substrate. In an embodiment, the window WM may be the glass substrate that is strengthened.

The upper protective layer PL may perform a function to protect the window WM. The upper protective layer PL may include a synthetic resin film. The synthetic resin film may include polyimide, polycarbonate, polyamide, triacetylcellulose, polymethylmethacrylate, or polyethylene terephthalate. Although not shown in drawing figures, at least one of a hard coating layer, an anti-fingerprint layer, and an anti-reflective layer may be disposed on the upper protective layer PL.

The electronic device ED may further include an adhesive layer (not shown) disposed between the display module DM and the window WM. The adhesive layer (not shown) may be an optically clear adhesive ("OCA") film or an optically clear adhesive resin ("OCR") layer.

The display module DM may display the image in response to electrical signals and may transmit/receive information about the external input. The display module DM may include a display area DP-DA and a non-display area DP-NDA. The display area DP-DA may be defined as an area through which the image provided from the display module DM transmits.

The non-display area DP-NDA may be defined adjacent to the display area DP-DA. In an embodiment, the non-display area DP-NDA may surround the display area DP-DA. However, this is merely one of embodiments, and the non-display area DP-NDA may be defined in various shapes and should not be particularly limited. In an embodiment, the display area DP-DA of the display module DM may correspond to at least a portion of the active area F-AA (refer to FIG. 1A). Although not shown in drawing figures, the display module DM may include a display panel (not shown) and an input sensor (not shown) disposed on the display panel (not shown).

The display module DM may include a folding display portion FA-D and non-folding display portions NFA1-D and NFA2-D. The folding display portion FA-D may correspond to the folding area FA1 (refer to FIG. 1A), and the non-folding display portions NFA1-D and NFA2-D may respectively correspond to the non-folding areas NFA1 and NFA2 (refer to FIG. 1A).

The folding display portion FA-D may be folded or bent with respect to the first folding axis FX1 extending in the first directional axis DR1. The display module DM may include a first non-folding display portion NFA1-D and a second non-folding display portion NFA2-D, and the first non-folding display portion NFA1-D and the second non-folding display portion NFA2-D may be spaced apart from each other with the folding display portion FA-D interposed therebetween.

The lower module SM of the electronic device ED may include a support member SPM and a filling portion SAP. The support member SPM may overlap most portion of the display module DM. The filling portion SAP may be disposed outside the support member SPM and may overlap an outer portion of the display module DM.

The support member SPM may include at least one of a support plate, a cushion layer, a shielding layer, and an inter-adhesive layer including a metal material or a polymer material. The support member SPM may support the display module DM or may prevent the display module DM from being deformed due to external impact or force.

The cushion layer may include a sponge, a foam, or an elastomer such as a urethane resin. In addition, the cushion layer may include at least one of an acrylic-based polymer, a urethane-based polymer, a silicon-based polymer, and an imide-based polymer. The shielding layer may be an electromagnetic shielding layer or a heat dissipation layer. In addition, the shielding layer may perform a function of an adhesive layer. The inter-adhesive layer may be provided in the form of an adhesive resin layer or an adhesive tape. The inter-adhesive layer may attach members included in the support member SPM to each other.

The filling portion SAP may be disposed outside the support member SPM. The filling portion SAP may be disposed between the display module DM and the housing HAU. The filling portion SAP may be filled in a space between the lower protective layer PF and the housing HAU and may fix the lower protective layer PF.

In addition, the electronic device ED may further include at least one adhesive layer AP2. The adhesive layer AP2 may be disposed between the lower protective layer PF and the lower module SM. The adhesive layer AP2 may be an OCA film or an OCR layer. However, the illustrated embodiment should not be limited thereto or thereby, and the adhesive layer AP2 may have a transmittance equal to or lower than about 80%.

The window WM may include a folding portion FP and non-folding portions NFP1 and NFP2. The folding portion FP may correspond to the folding area FA1 of the electronic device ED. The folding portion FP of the window WM may correspond to the folding display portion FA-D of the display module DM.

The folding portion FP of the window WM may be folded with respect to the first folding axis FX1 extending in the first direction DR1. A first non-folding portion NFP1 and a second non-folding portion NFP2 may be spaced apart from each other in the second direction DR2 perpendicular to the first direction DR1 with the folding portion FP interposed therebetween.

The window WM may include a base portion BM and a plurality of protrusion portions PT protruded from the base portion BM to the upper protective layer PL. The protrusion portions PT may be spaced apart from each other in the second direction DR2. In an embodiment, a recess pattern may be defined in the window WM by the protrusion portions PT spaced apart from each other.

FIG. 4A shows a structure in which the protrusion portions PT are arranged in the second direction DR2 at regular distances, however, this is merely one of embodiments. In an embodiment, the distances, in the second direction DR2, between the protrusion portions PT may be different from each other, or at least one distance among the distances may be different from the other. In detail, the distances, in the second direction DR2, between the protrusion portions PT may decrease as a distance from the first folding axis FX1 of the window WM decreases or may increase as the distance from the first folding axis FX1 of the window WM increases.

In addition, as shown in FIG. 4A, the protrusion portions PT may have the same height in the third direction DR3, however, this is merely one of embodiments. In an embodiment, heights of the protrusion portions PT in the third direction DR3 may be different from each other, or the height of at least one protrusion portion may be different from the heights of the other protrusion portions.

In addition, FIG. 4A shows a structure in which the base portion BM is disposed closer to the display module DM than the protrusion portions PT are, however, this is merely one of embodiments. In an embodiment, as shown in FIG. 4B, protrusion portions PT may be disposed closer to the display module DM than the base portion BM is in the electronic device ED-1.

FIGS. 5A to 5D are plan views of an embodiment of a portion of windows according to the invention. FIG. 6 is a perspective view of an embodiment of a portion of the window WM according to the invention. FIGS. 5A to 5D are plan views corresponding to a portion AA of FIG. 3.

Figure 5A:
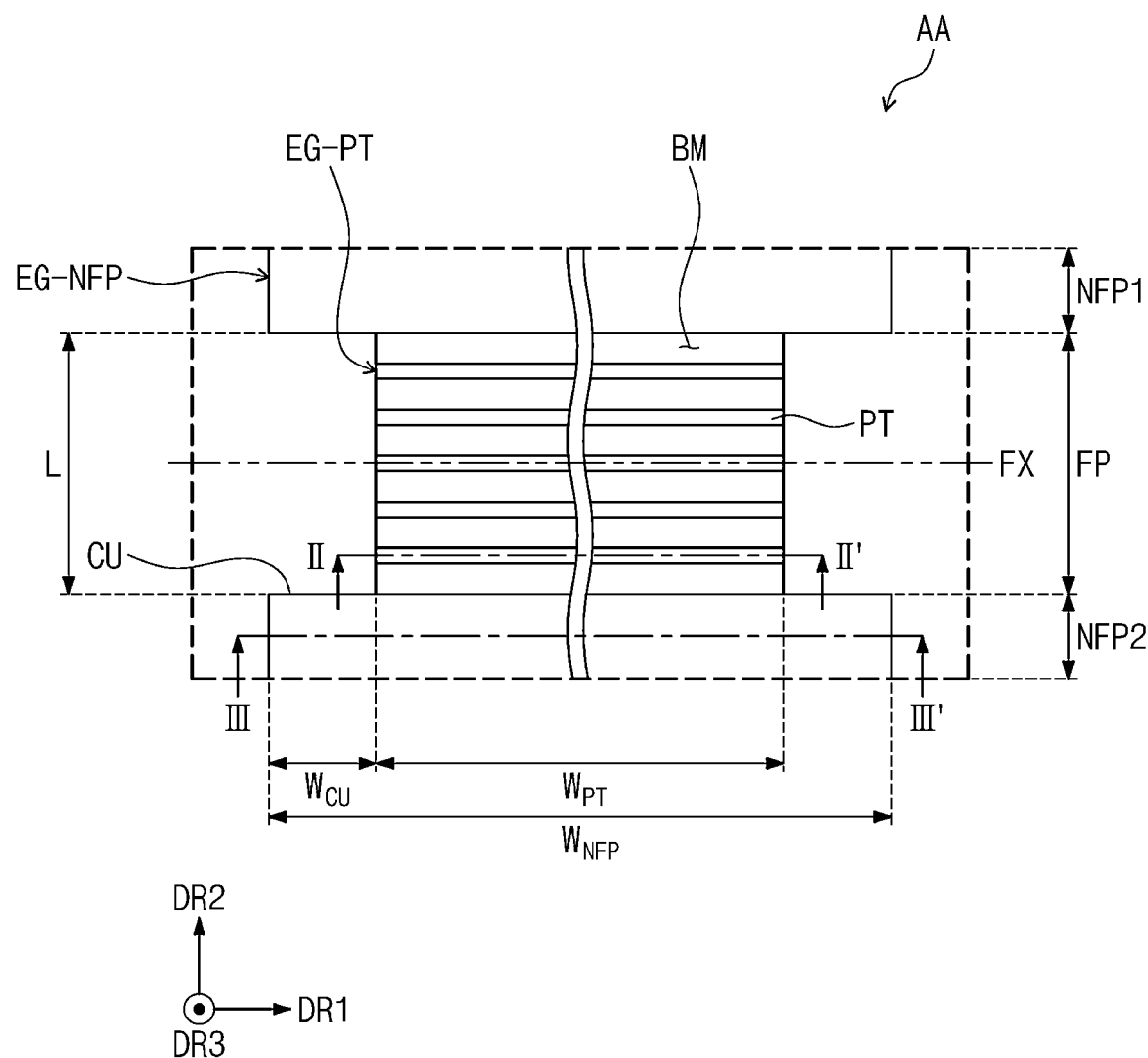
FIG. 5A is a plan view of an embodiment of a portion of a window according to the invention.
Figure 6:
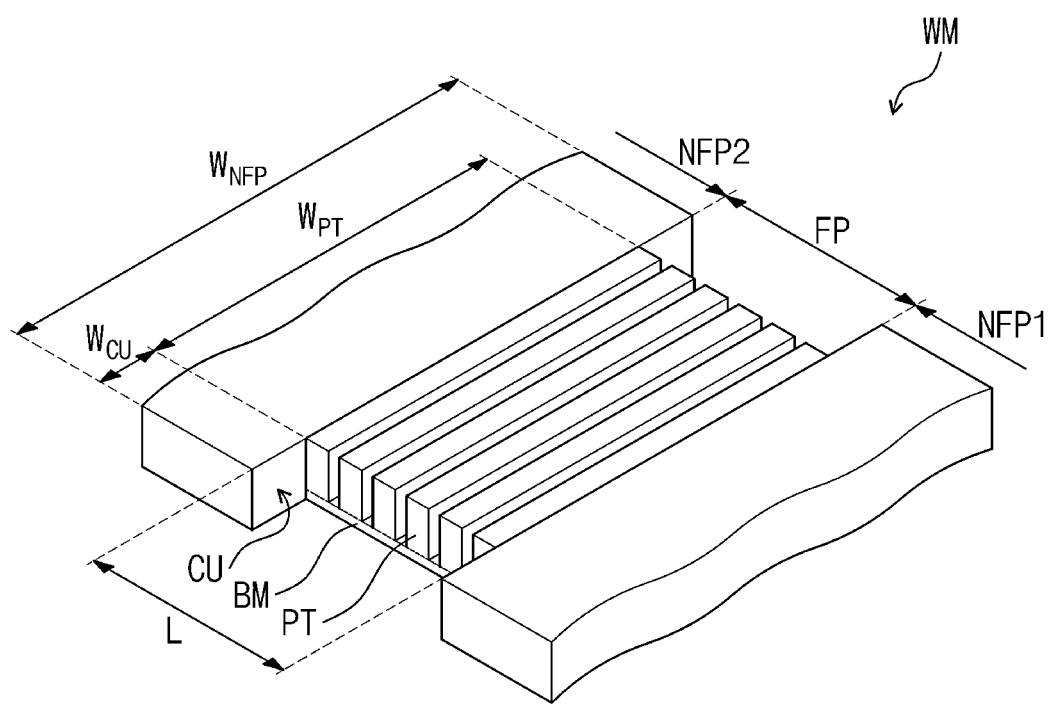
FIG. 6 is a perspective view of an embodiment of a portion of a window according to the invention.
Figure 6:
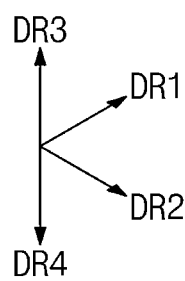

Referring to FIGS. 5A and 6, a width $W_{PT}$, in the first direction DR1, of the folding portion FP of the window WM may be smaller than a width $W_{NFP}$, in the first direction DR1, of each of the first non-folding portion NFP1 and the second non-folding portion NFP2. The folding portion FP may be disposed further inward than the non-folding portions NFP1 and NFP2 in the first direction DR1. Since the width $W_{PT}$, in the first direction DR1, of the folding portion FP of the window WM is smaller than the width $W_{NFP}$, in the first direction DR1, of each of the first non-folding portion NFP1 and the second non-folding portion NFP2, the window WM may have excellent folding characteristics. In an embodiment, the folding portion FP may be folded with reference to a folding axis FX.

The base portion BM may be disposed further inward than the non-folding portions NFP1 and NFP2 in the first direction DR1. The protrusion portions PT may be disposed further inward than the non-folding portions NFP1 and NFP2 in the first direction DR1.

The protrusion portions PT may be disposed further inward than the first non-folding portion NFP1 and the second non-folding portion NFP2. As the protrusion portions PT are disposed further inward than the first non-folding portion NFP1 and the second non-folding portion NFP2, the protrusion portions PT may be prevented from being damaged by external impacts.

A width $W_{PT}$, in the first direction DR1, of the protrusion portions PT may be smaller than the width $W_{NFP}$, in the first direction DR1, of each of the first non-folding portion NFP1 and the second non-folding portion NFP2. In an embodiment, an absolute value of a difference between the width $W_{PT}$, in the first direction DR1, of the protrusion portions PT and the width $W_{NFP}$, in the first direction DR1, of each of the first non-folding portion NFP1 and the second non-folding portion NFP2 may be equal to or greater than about 1 mm and equal to or smaller than about 100 mm. The absolute value of the difference between the width $W_{PT}$, in the first direction DR1, of the protrusion portions PT and the width $W_{NFP}$, in the first direction DR1, of each of the first non-folding portion NFP1 and the second non-folding portion NFP2 may correspond to a width $W_{CU}$, in the first direction DR1, of a concave portion CU.

Figure 5B:
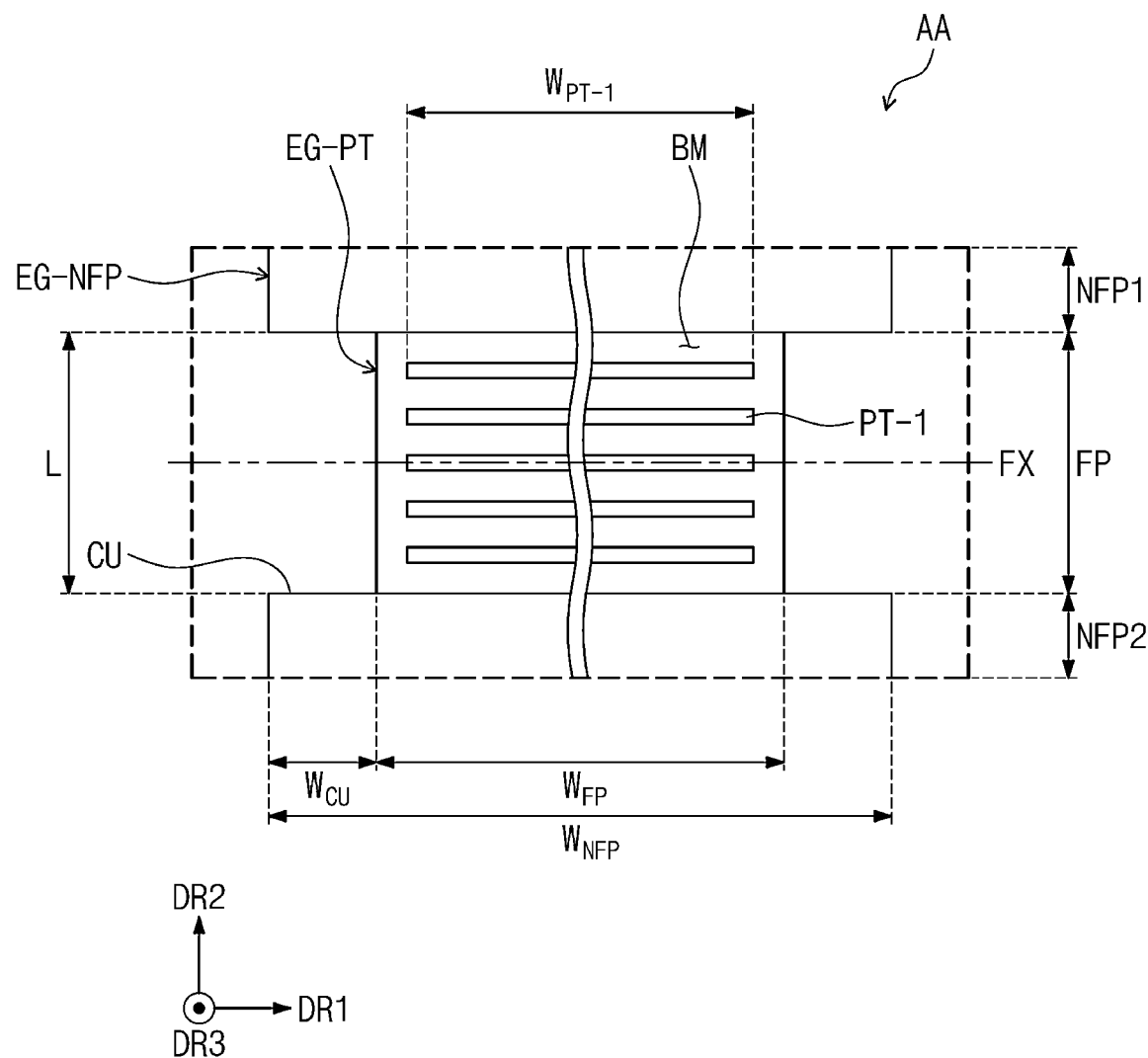
FIG. 5B is a plan view of an embodiment of a portion of a window according to the invention.

Since the width $W_{PT}$, in the first direction DR1, of the folding portion FP and the width $W_{PT}$, in the first direction DR1, of the protrusion portion PT are the same as each other in FIG. 5A, they are assigned with the same reference numerals, however, this is merely one of embodiments. In an embodiment, a width $W_{PT-1}$, in the first direction DR1, of a protrusion portion PT-1 may be smaller than a width $W_{FP}$, in the first direction DR1, of a folding portion FP as shown in FIG. 5B.

Each of the protrusion portions PT may include a protrusion edge portion EG-PT substantially parallel to the second direction DR2. Each of the non-folding portions NFP1 and NFP2 may include a non-folding edge portion EG-NFP substantially parallel to the second direction DR2. In a plan view, the protrusion edge portion EG-PT may be disposed further inward than the non-folding edge portion EG-NFP in the first direction DR1. In an embodiment, the protrusion edge portion EG-PT may be disposed further inward than the non-folding edge portion EG-NFP in a range equal to or greater than about 0.5 mm and equal to or smaller than about 50 mm in the first direction DR1. In a plan view, as the protrusion edge portion EG-PT is disposed further inward than the non-folding edge portion EG-NFP in the first direction DR1, the protrusion edge portion EG-PT may be prevented from being damaged by external impacts.

A maximum width $W_{CU}$, in the first direction DR1, of the concave portion CU may be equal to or greater than about 0.5 mm and equal to or smaller than about 50 mm. A width L, in the second direction DR2, of the concave portion CU may be equal to or greater than about $0.5\pi$ mm and equal to or smaller than about 20 mm.

In an embodiment, the window WM may be provided with the concave portion CU concaved in an inward direction in an area corresponding to the folding portion FA. That is, in a plan view, the concave portion CU may be defined by an edge of the first non-folding portion NFP1 adjacent to the folding portion FP, an edge of the second non-folding portion NFP2 adjacent to the folding portion FP, and an edge of the folding portion FP. In a plan view, the edge of the folding portion FP may be perpendicular to the edge of each of the first non-folding portion NFP1 and the second non-folding portion NPF2. That is, the concave portion CU may have a shape whose corners respectively adjacent to the first non-folding portion NFP1 and the second non-folding portion NFP2 have a right angle, however, this is merely one of embodiments, and the invention should not be limited thereto or thereby. In an embodiment, in a plan view, the concave portion CU may have a shape whose corners respectively adjacent to the first non-folding portion NFP1 and the second non-folding portion NFP2 have an acute angle, an obtuse angle, or a curved line. In detail, as shown in FIGS. 5C and 5D, concave portions CU1 and CU2 may have a U shape or a V shape in a plan view.

Figure 5C:
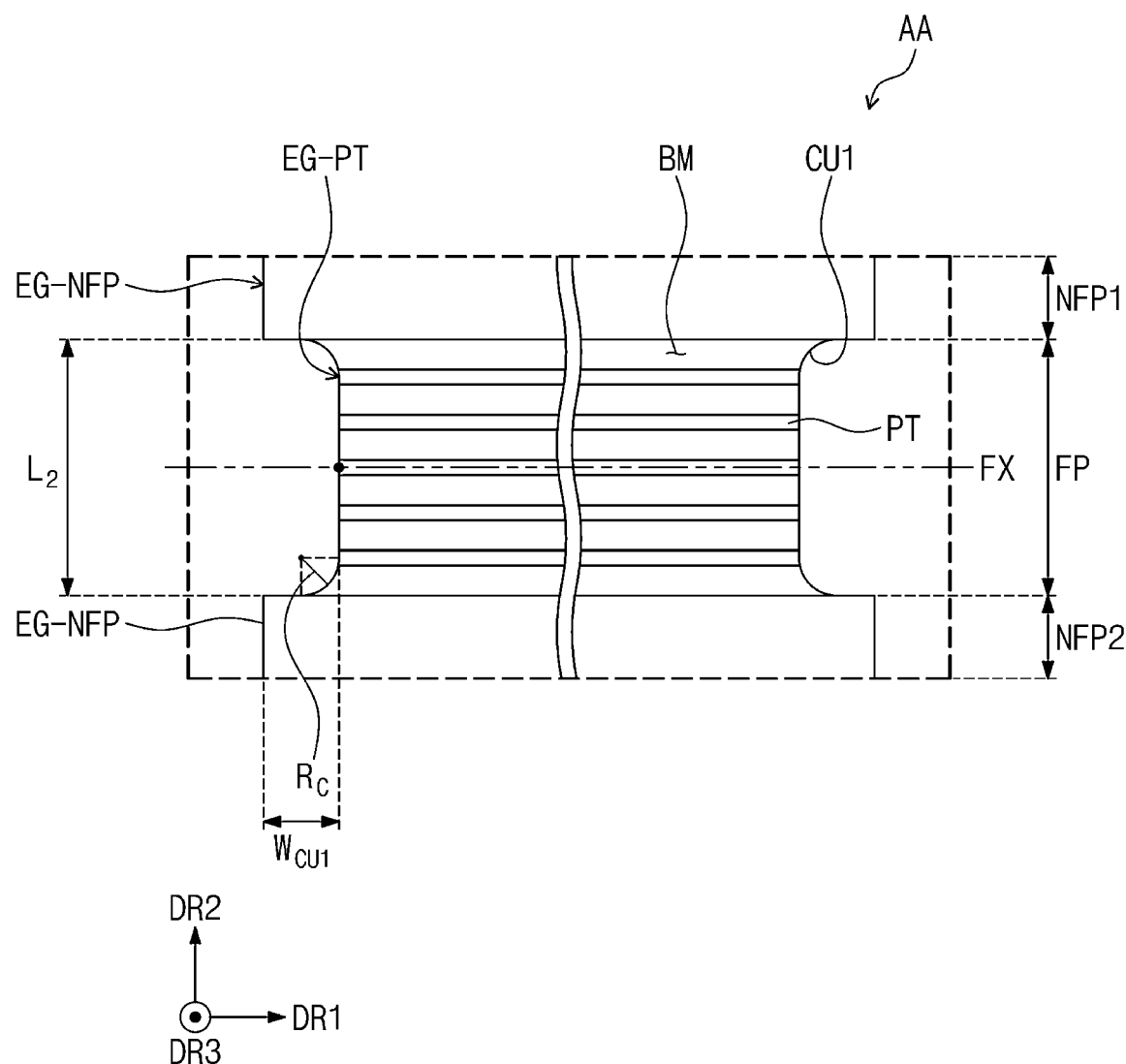
FIG. 5C is a plan view of an embodiment of a portion of a window according to the invention.

In the case where the concave portion CU1 has the U shape in a plane as shown in FIG. 5C, a radius of curvature $R_c$ of corners of the concave portion CU1 adjacent to the first non-folding portion NFP1 and the second non-folding portion NFP2 may be equal to or greater than about 0.1 mm and equal to or smaller than about 2.0 mm. In an embodiment, a width $W_{CU1}$, in the first direction DR1, of the concave portion CU1 may be the same as or similar to a width $W_{CU}$ of the concave portion CU. In an embodiment, a width $L_2$, in the second direction DR2, of the concave portion CU1 may be the same as or similar to a width L of the concave portion CU.

Figure 5D:
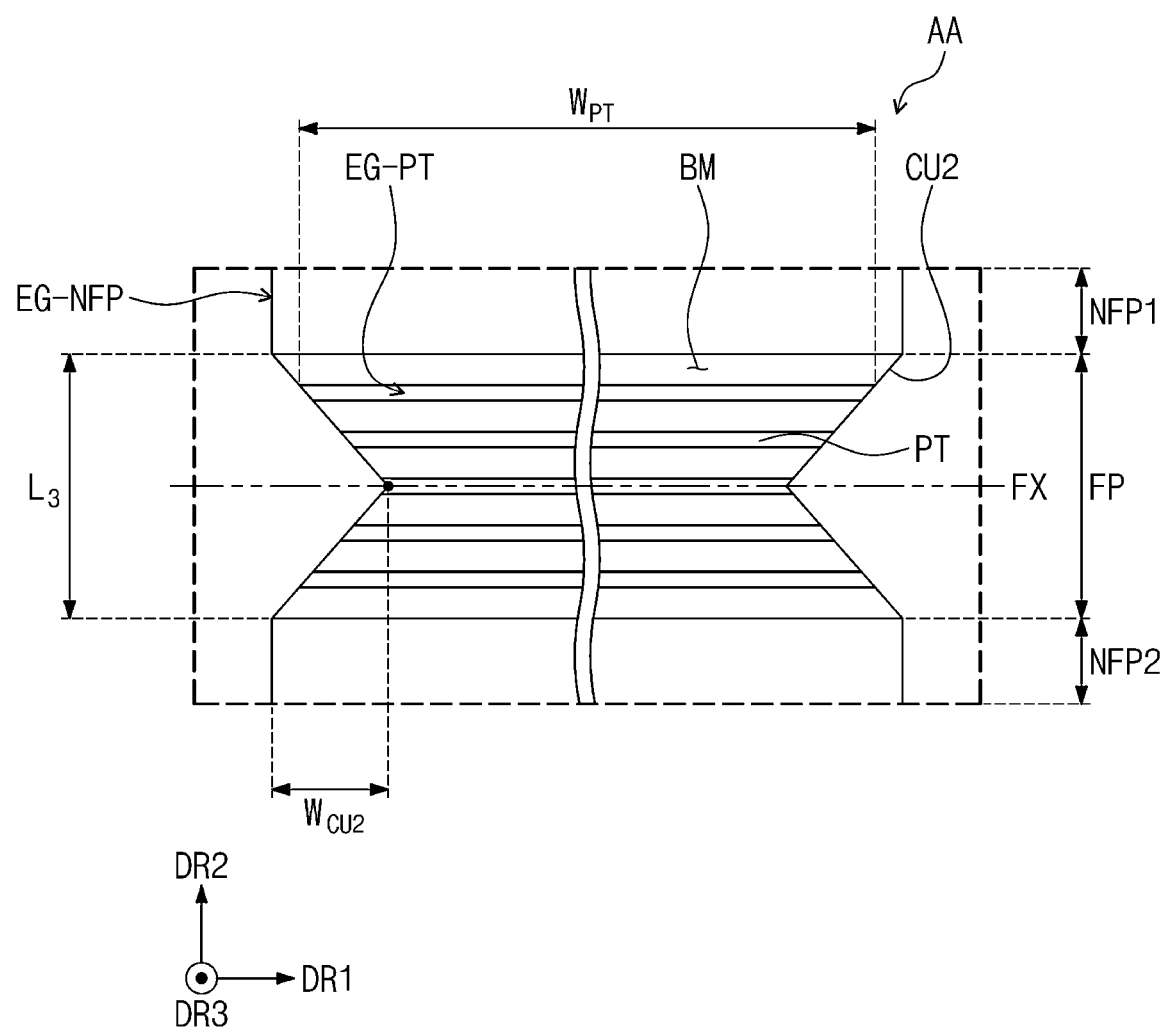
FIG. 5D is a plan view of a portion of an embodiment of a window according to the invention.

In the case where the concave portion CU2 has the V shape in a plane as shown in FIG. 5D, a length $W_{PT}$, in the first direction DR1, of the protrusion portions PT may decrease from an outer portion to an inner portion, however, this is merely one of embodiments, and the invention should not be limited thereto or thereby. In an embodiment, although the concave portion CU2 has the V shape in a plan view, the protrusion portions PT may be disposed on inside of an edge of the folding portion FP, and the length $W_{PT}$, in the first direction DR1, of the protrusion portions PT may be uniform. In an embodiment, a width $W_{CU2}$, in the first direction DR1, of the concave portion CU2 may be the same as or similar to a width $W_{CU}$ of the concave portion CU. In an embodiment, a width $L_3$, in the second direction DR2, of the concave portion CU2 may be the same as or similar to a width L of the concave portion CU.

Figure 7A:
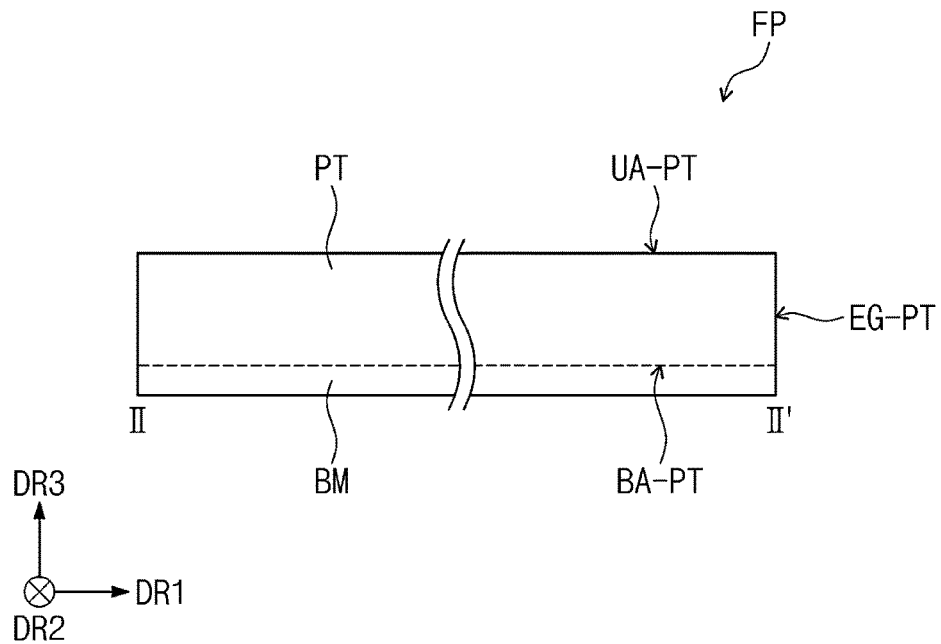
FIG. 7A is a cross-sectional view of an embodiment of a folding portion according to the invention.
Figure 7B:
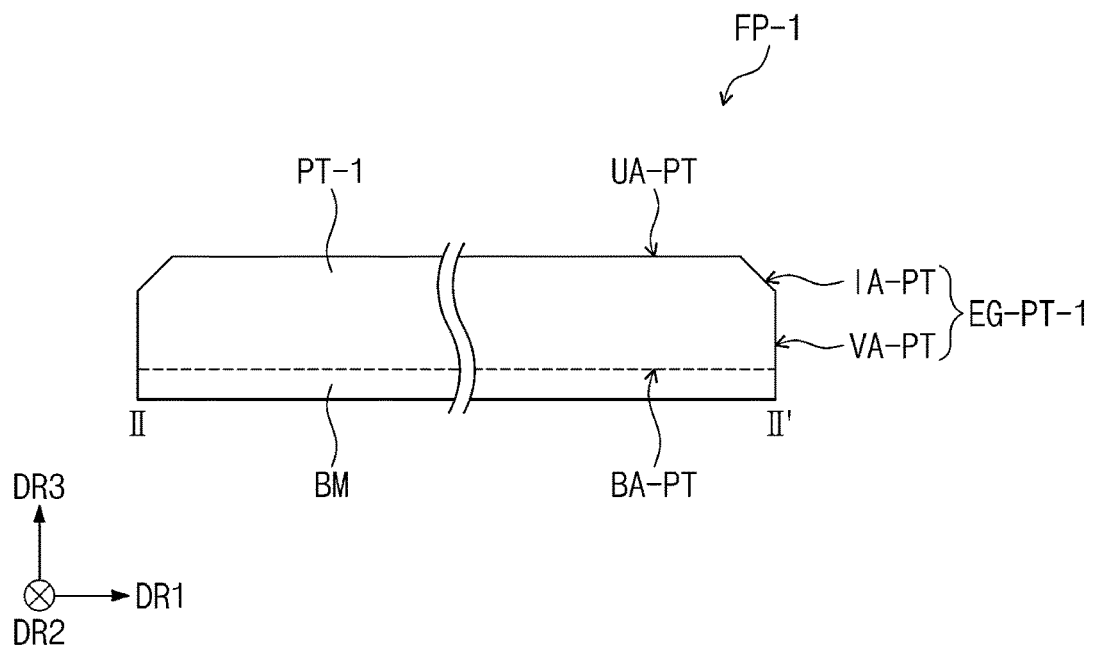
FIG. 7B is a cross-sectional view of an embodiment of a folding portion according to the invention.
Figure 7C:
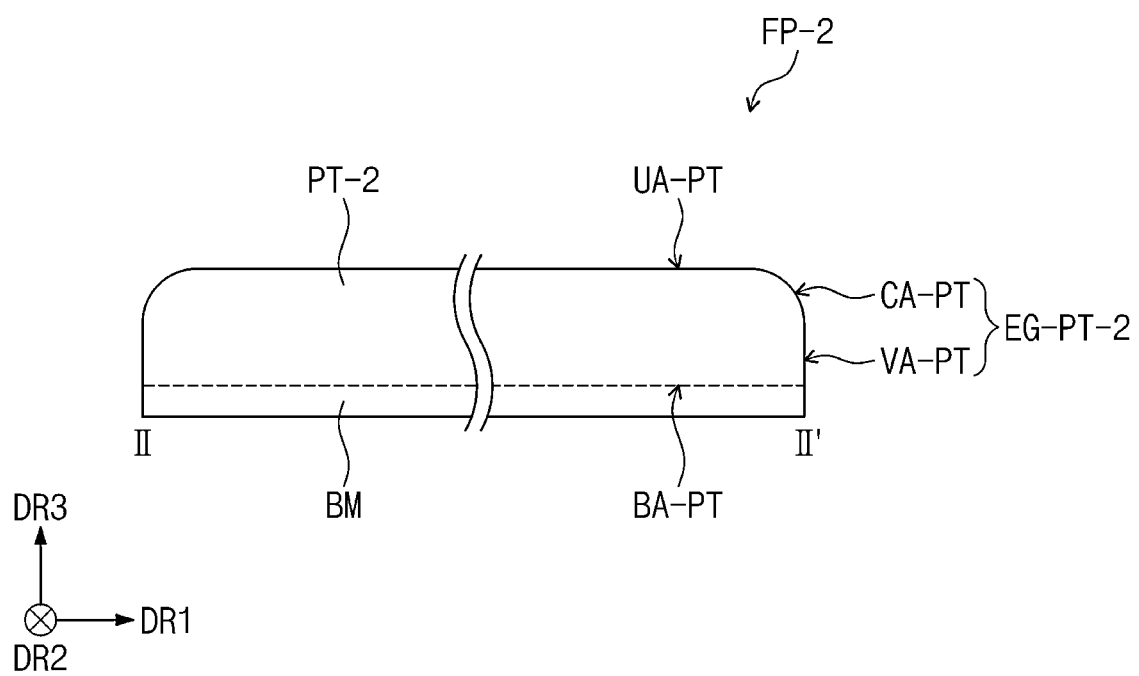
FIG. 7C is a cross-sectional view of an embodiment of a folding portion according to the invention.

FIGS. 7A to 7C are cross-sectional views of an embodiment of folding portions FP, FP-1, and FP-2 according to the invention. FIGS. 7A to 7C are cross-sectional views taken along line II-II' of FIG. 5A according to the invention.

Referring to FIG. 7A, the folding portion FP may include a protrusion portion PT having a quadrangular (e.g., rectangular) shape when viewed in a cross-section. In an embodiment, the protrusion portion PT may include a protrusion lower surface portion BA-PT adjacent to a base portion BM, a protrusion upper surface portion UA-PT facing the protrusion lower surface portion BA-PT, and a protrusion edge portion EG-PT disposed between the protrusion lower surface portion BA-PT and the protrusion upper surface portion UA-PT and substantially parallel to the second direction DR2. The protrusion upper surface portion UA-PT may have the same width as a width of the protrusion lower surface portion BA-PT in the first direction DR1.

The protrusion edge portion EG-PT may be perpendicular to the protrusion lower surface portion BA-PT and the protrusion upper surface portion UA-PT, however, this is merely one of embodiments. In an embodiment, the folding portions FP-1 and FP-2 may include a protrusion portion whose protrusion edge portion is slanted or whose protrusion edge portion is curved when viewed in a cross-section.

In an embodiment, a protrusion portion PT-1 may include a protrusion edge portion EG-PT-1 that includes a protrusion vertical portion VA-PT perpendicular to a protrusion lower surface portion BA-PT and a protrusion slant portion IA-PT disposed between the protrusion vertical portion VA-PT and a protrusion upper surface portion UA-PT and slanted with respect to the protrusion upper surface portion UA-PT and the protrusion vertical portion VA-PT as shown in FIG. 7B. A width, in the first direction DR1, of the protrusion lower surface portion BA-PT may be the same as a width, in the first direction DR1, of the base portion BM. A width, in the first direction DR1, of the protrusion upper surface portion UA-PT may be smaller than the width, in the first direction DR1, of the base portion BM. In an embodiment, the width, in the first direction DR1, of the protrusion portion PT-1 may decrease from the protrusion lower surface portion BA-PT to the protrusion upper surface portion UA-PT. As the protrusion portion PT-1 includes the protrusion slant portion IA-PT, an impact resistance of the protrusion portion PT-1 with respect to external impacts may be improved. In addition, a protrusion portion PT-2 may include a protrusion edge portion EG-PT-2 that includes a protrusion vertical portion VA-PT perpendicular to a protrusion lower surface portion BA-PT and a protrusion curved surface portion CA-PT disposed between the protrusion vertical portion VA-PT and the protrusion upper surface portion UA-PT and curved in an outward direction of the protrusion portion PT-2 as shown in FIG. 7C. A width, in the first direction DR1, of the protrusion lower surface portion BA-PT may be the same as a width, in the first direction DR1, of a base portion BM. A width, in the first direction DR1, of the protrusion upper surface portion UA-PT may be smaller than the width, in the first direction DR1, of the base portion BM. The width, in the first direction DR1, of the protrusion portion PT-2 may decrease from the protrusion lower surface portion BA-PT to the protrusion upper surface portion UA-PT. As the protrusion portion PT-2 includes the protrusion curved surface portion CA-PT, an impact resistance of the protrusion portion PT-2 with respect to external impacts may be improved.

Figure 8A:
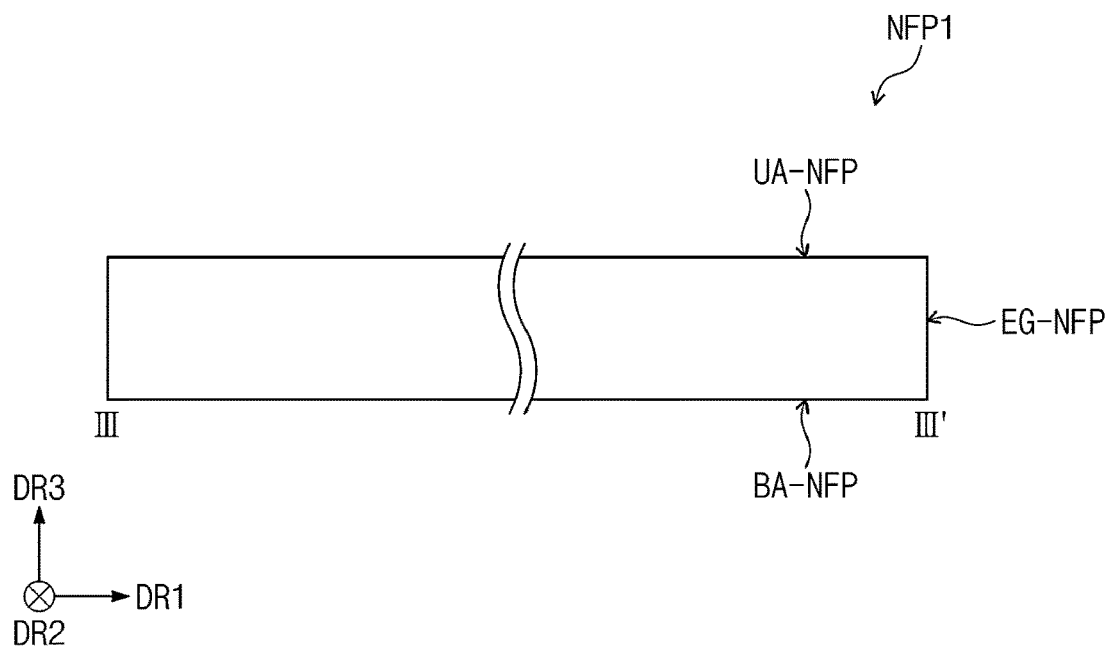
FIG. 8A is a cross-sectional view of an embodiment of a non-folding portion according to the invention.
Figure 8B:
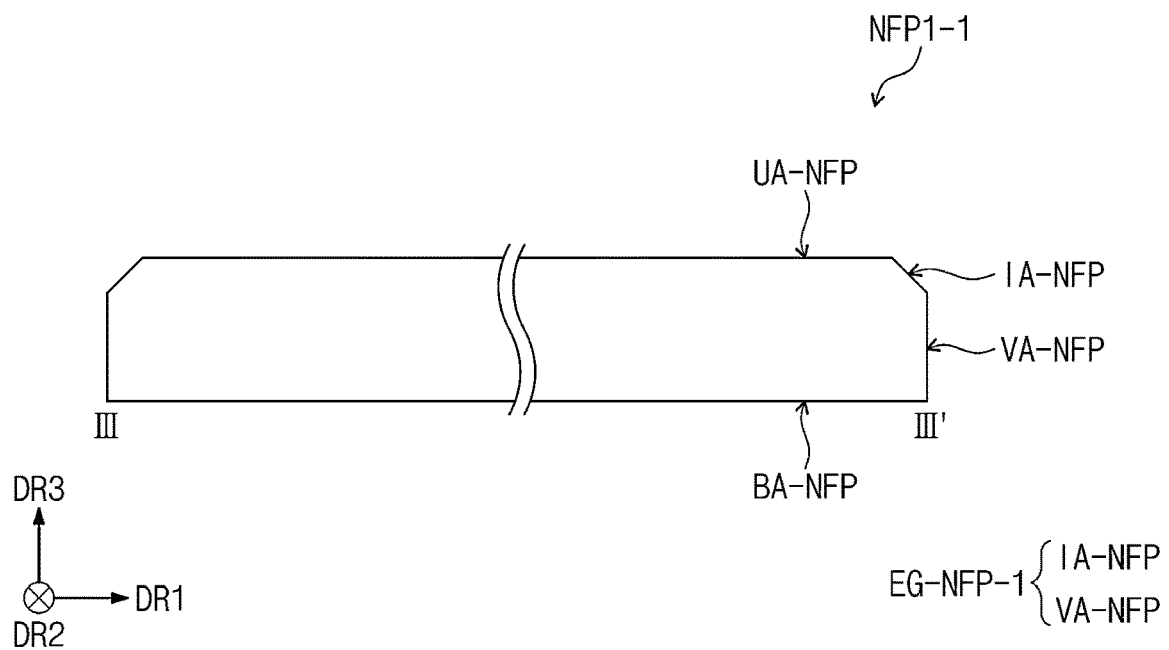
FIG. 8B is a cross-sectional view of an embodiment of a non-folding portion according to the invention.
Figure 8C:
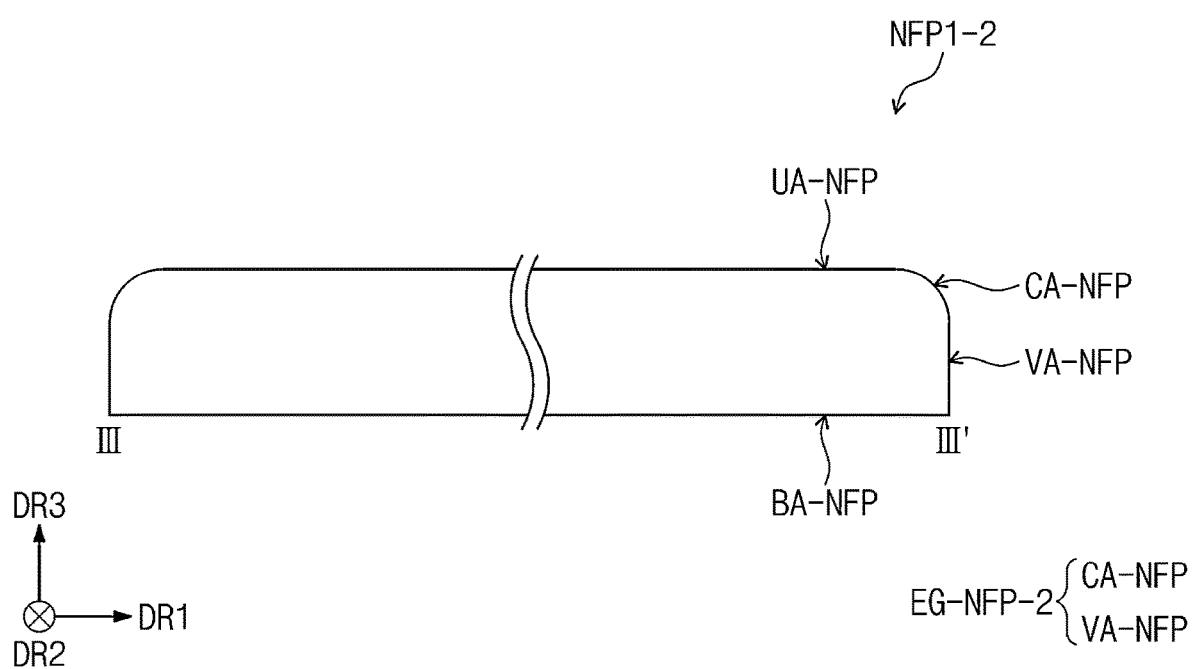
FIG. 8C is a cross-sectional view of an embodiment of a non-folding portion according to the invention.

FIGS. 8A to 8C are cross-sectional views of an embodiment of first non-folding portions NFP1, NFP1-1, and NFP1-2 according to the invention. FIGS. 8A to 8C are cross-sectional views of an embodiment of the first non-folding portions NFP1, NFP1-1, and NFP1-2 taken along line III-III' of FIG. 5A according to the invention.

Referring to FIG. 8A, the first non-folding portion NFP1 may have a quadrangular (e.g., rectangular) shape when viewed in a cross-section. The first non-folding portion NFP1 may include anon-folding lower surface portion BA-NFP, a non-folding upper surface portion UA-NFP facing the non-folding lower surface portion BA-NFP, and a non-folding edge portion EG-NFP disposed between the non-folding lower surface portion BA-NFP and the non-folding upper surface portion UA-NFP and substantially parallel to the second direction DR2. A width, in the first direction DR1, of the non-folding lower surface portion BA-NFP may be the same as a width, in the first direction DR1, of the non-folding upper surface portion UA-NFP.

The non-folding edge portion EG-NFP may be substantially perpendicular to each of the non-folding lower surface portion BA-NFP and the non-folding upper surface portion UA-NFP, however, this is merely one of embodiments. In an embodiment, the first non-folding portions NFP1-1 and NFP1-2 may have a shape whose non-folding edge portion is slanted or is curved when viewed in a cross-section.

In an embodiment, as shown in FIG. 8B, the first non-folding portion NFP1-1 may include anon-folding edge portion EG-NFP-1 that includes anon-folding vertical portion VA-NFP perpendicular to a non-folding lower surface portion BA-NFP and a non-folding slant portion IA-NFP disposed between the non-folding vertical portion VA-NFP and anon-folding upper surface portion UA-NFP and slanted from the non-folding upper surface portion UA-NFP to the non-folding vertical portion VA-NFP, for example. A width, in the first direction DR1, of the non-folding upper surface portion UA-NFP may be smaller than a width, in the first direction DR1, of the non-folding lower surface portion BA-NFP. The first non-folding portion NFP1-1 may have a width that decreases from the non-folding lower surface portion BA-NFP to the non-folding upper surface portion UA-NFP in the first direction DR1. As the first non-folding portion NFP1-1 includes the non-folding slant portion IA-NFP, an impact resistance of the first non-folding portion NFP1-1 against the external impacts may be improved.

In addition, as shown in FIG. 8C, the first non-folding portion NFP1-2 may include a non-folding edge portion EG-NFP-2 that includes a non-folding vertical portion VA-NFP perpendicular to a non-folding lower surface portion BA-NFP and a non-folding curved surface portion CA-NFP disposed between the non-folding vertical portion VA-NFP and a non-folding upper surface portion UA-NFP and slanted in an outward direction of the first non-folding portion NFP1-2. A width, in the first direction DR1, of the non-folding upper surface portion UA-NFP may be smaller than a width in first direction DR1 of the non-folding lower surface portion BA-NFP. The first non-folding portion NFP1-2 may have a width that decreases from the non-folding lower surface portion BA-NFP to the non-folding upper surface portion UA-NFP in the first direction DR1. As the first non-folding portion NFP1-2 includes the non-folding curved surface portion CA-NFP, an impact resistance of the first non-folding portion NFP1-2 against the external impacts may be improved.

In FIGS. 8A to 8C, only the first non-folding portions NFP1, NFP1-1, and NFP1-2 are described, however, the first non-folding portions NFP1, NFP1-1, and NFP1-2 described with reference to FIGS. 8A to 8C may be applied to the second non-folding portion NFP2 (refer to FIG. 5A).

In FIGS. 9 to 14, details of windows that are the same as those described with reference to FIGS. 1 to 8C are not repeated, and different features will be mainly described.

Figure 9:
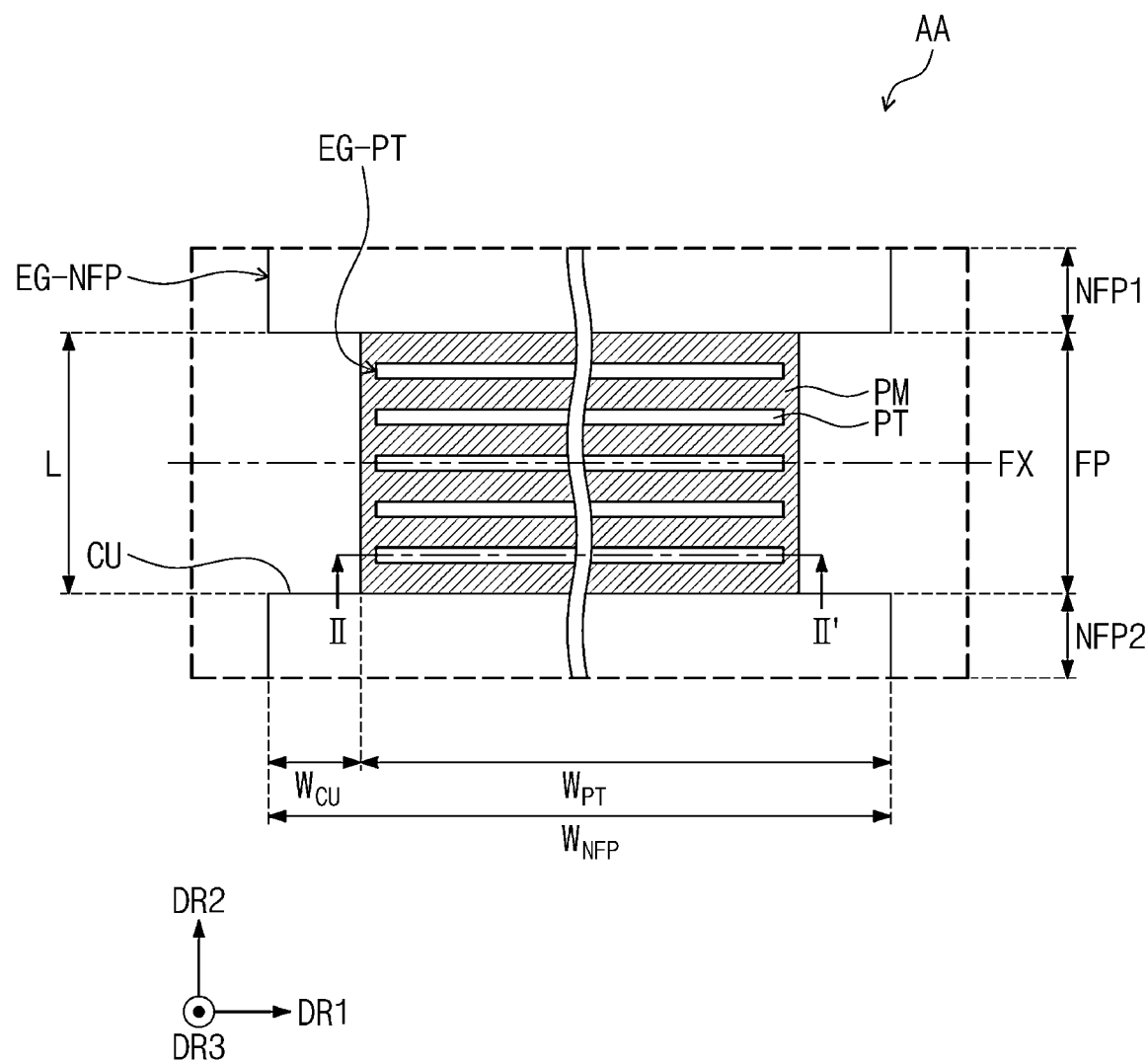
FIG. 9 is a cross-sectional view of an embodiment of a window according to the invention.
Figure 10:
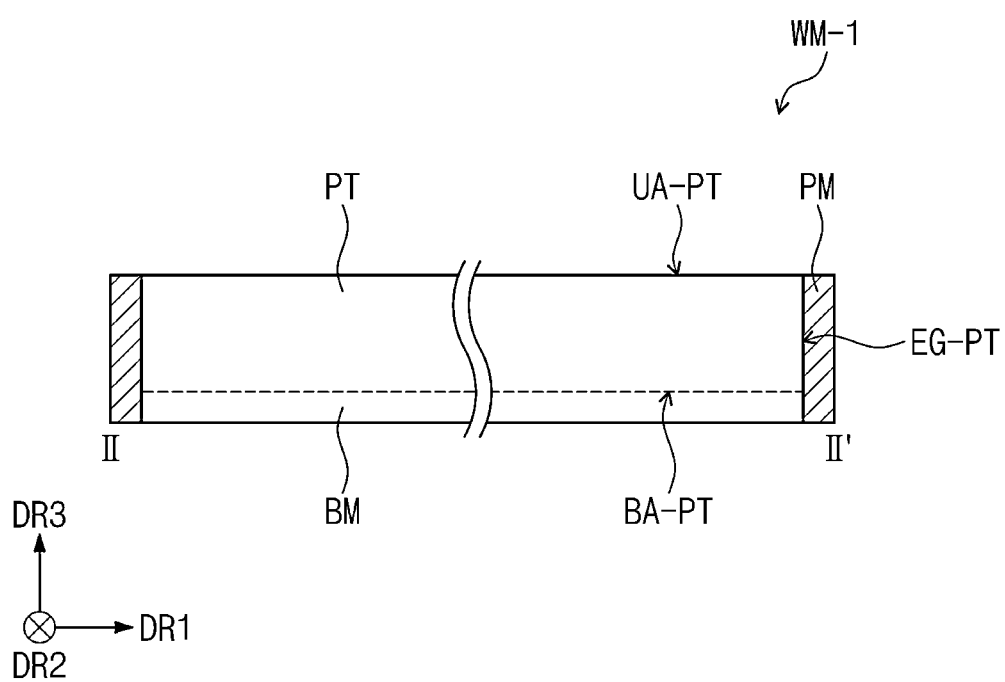
FIG. 10 is a cross-sectional view of an embodiment of a folding portion according to the invention.

FIG. 9 is a plan view of an embodiment of a window according to the invention. FIG. 10 is a cross-sectional view of an embodiment of a folding portion according to the invention. FIG. 10 is a cross-sectional view of a protrusion portion taken along line II-II' of FIG. 9.

Different from the windows described with reference to FIGS. 1 to 8C, the window shown in FIGS. 9 and 10 may further include a protrusion protective layer PM.

Referring to FIGS. 9 and 10, the window WM-1 may further include the protrusion protective layer PM to protect protrusion portions PT. The protrusion protective layer PM may be filled in between the protrusion portions PT. The protrusion protective layer PM may cover a protrusion edge portion EG-PT. The protrusion protective layer PM may include a synthetic resin. The protrusion protective layer PM of the window WM-1 may protect the protrusion portions PT from external impacts.

Figure 11:
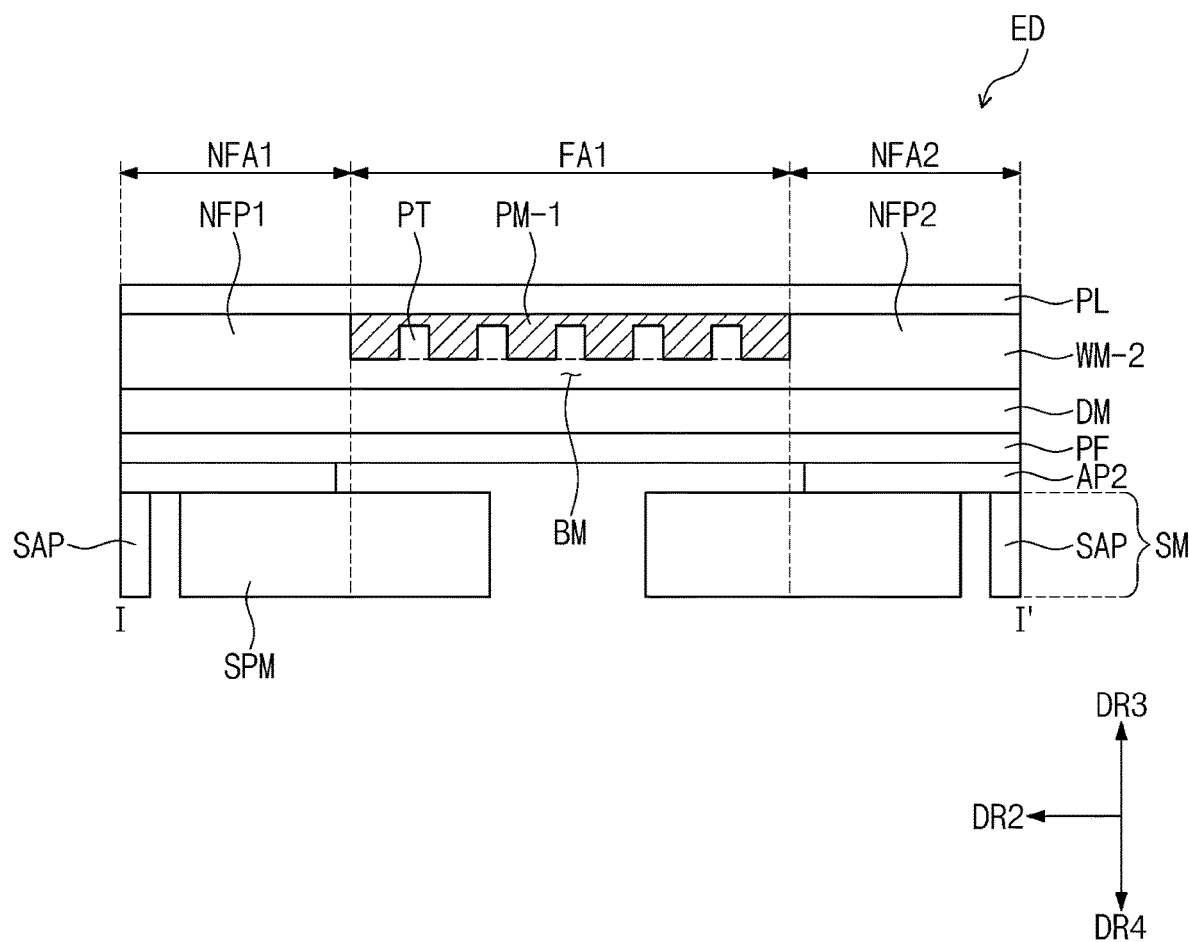
FIG. 11 is a cross-sectional view of an embodiment of an electronic device according to the invention.
Figure 12:
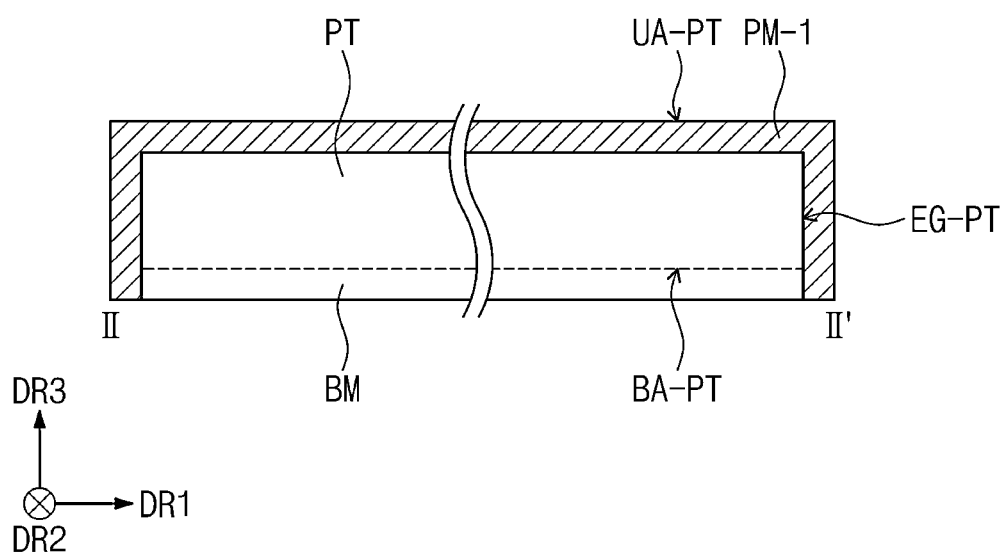
FIG. 12 is a cross-sectional view of an embodiment of a folding portion according to the invention.

FIG. 11 is a cross-sectional view of an embodiment of an electronic device according to the invention. FIG. 12 is a cross-sectional view of an embodiment of a folding portion according to the invention. FIG. 11 is a cross-sectional view of the electronic device taken along line I-I' shown in FIG. 3. FIG. 12 is a cross-sectional view of a protrusion portion taken along line II-II' of FIG. 9.

Different from the window described with reference to FIGS. 9 and 10, the window WM-2 shown in FIGS. 11 and 12 may include a protrusion protective layer PM-1 that further covers a protrusion upper surface portion UA-PT of the protrusion portion PT.

Referring to FIGS. 11 and 12, the window WM-2 may include the protrusion protective layer PM-1 that covers the protrusion upper surface portion UA-PT of the protrusion portions PT. That is, the protrusion protective layer PM-1 may cover an entirety of the protrusion portions PT. Since the protrusion protective layer PM-1 of the window WM-2 covers an entirety of the protrusion portions PT, the protrusion portions PT may be protected from the external impacts.

Figure 13:
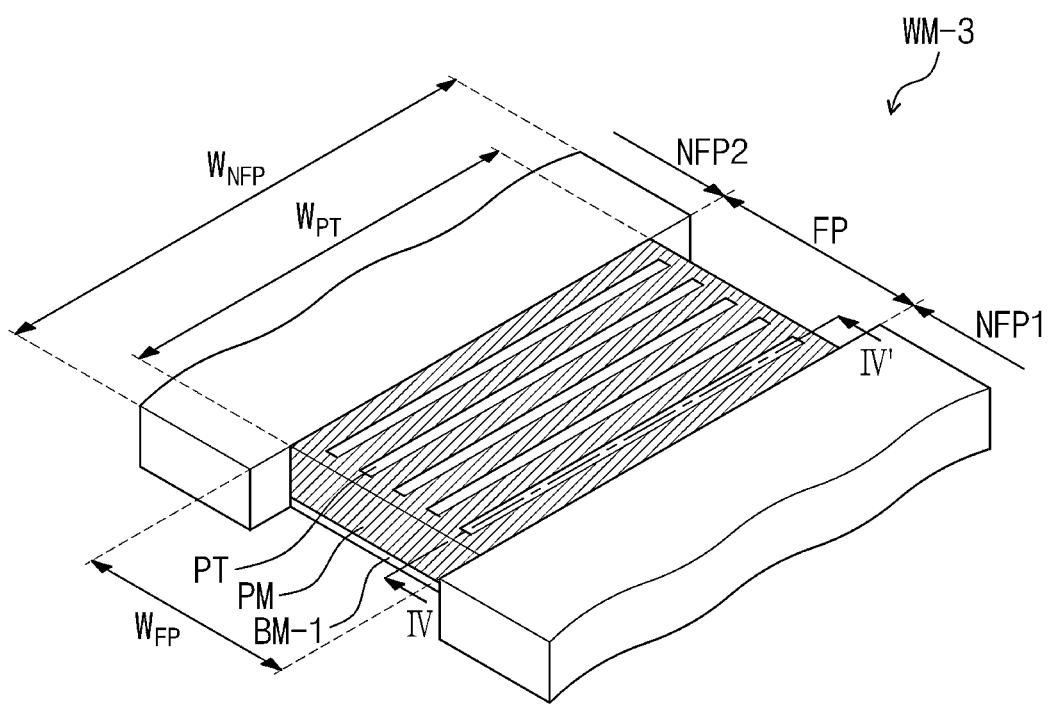
FIG. 13 is a perspective view of an embodiment of a window according to the invention.
Figure 13:
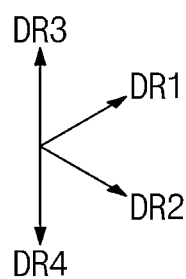
Figure 14:
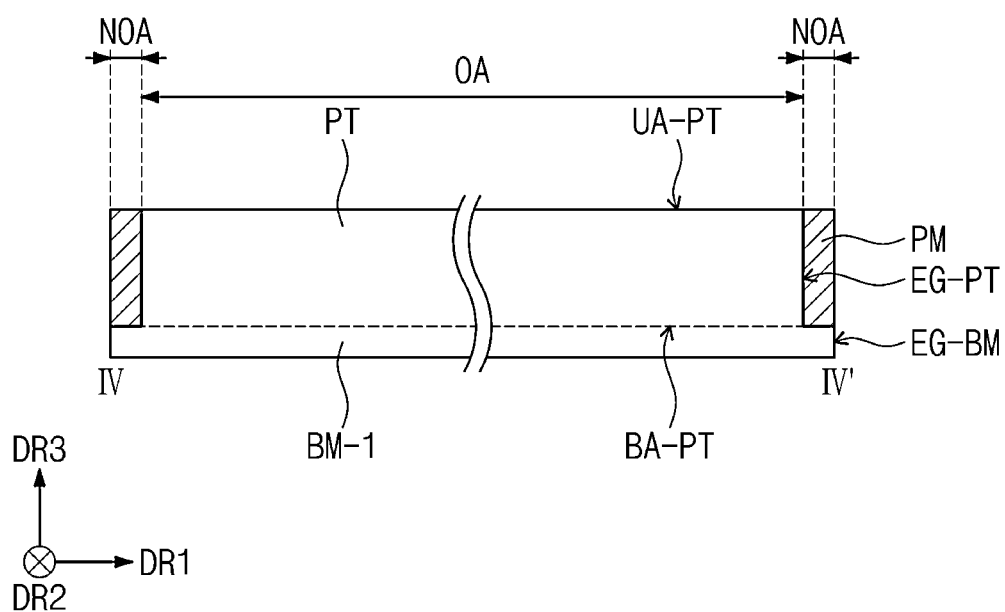
FIG. 14 is a cross-sectional view of an embodiment of a folding portion according to the invention.

FIG. 13 is a perspective view of an embodiment of a window according to the invention. FIG. 14 is a cross-sectional view of an embodiment of a folding portion according to the invention. FIG. 14 is a cross-sectional view of the folding portion taken along line IV-IV' shown in FIG. 13.

The window shown in FIGS. 13 and 14 may be different from the window described with reference to FIGS. 9 and 10 in that a base portion BM-1 includes a protrusion area OA that overlaps protrusion portions PT and a non-protrusion area NOA that does not overlap the protrusion portions PT and a protrusion protective layer PM covers the non-protrusion area NOA.

Referring to FIGS. 13 and 14, the base portion BM-1 of the window WM-3 may include the protrusion area OA that overlaps the protrusion portions PT and the non-protrusion area NOA that does not overlap the protrusion portions PT. The non-protrusion area NOA may be disposed further outward than the protrusion area OA in the window WM-3. The protrusion protective layer PM-2 may cover the non-protrusion area NOA. Since the base portion BM-1 of the window WM-3 includes the non-protrusion area NOA disposed further outward than the protrusion area OA in the window WM-3, a resin (not shown) for the protective layer, which is used to form the protrusion protective layer PM-2, may be prevented from overflowing to first and second non-folding portions NFP1 and NFP2. In an embodiment, a protrusion edge portion EG-PT of the protrusion portion PT may be disposed further inward than a base edge portion EG-BM.

The window may include the folding portion including the protrusion portion, and the width, in the first direction, of the folding portion may be smaller than the width, in the first direction, of the non-folding portion, and thus, the window may have excellent folding characteristics and impact resistance. In addition, as the electronic device may include the window that is disposed on the display module and includes the patterned folding portion whose width is smaller than the width of the non-folding portion, the electronic device may have excellent folding characteristics and mechanical physical characteristics.

Although the embodiments of the invention have been described, it is understood that the invention should not be limited to these embodiments but various changes and modifications may be made by one ordinary skilled in the art within the spirit and scope of the invention as hereinafter claimed.

Therefore, the disclosed subject matter should not be limited to any single embodiment described herein, and the scope of the invention shall be determined according to the attached claims.

What is claimed is:

1. A window comprising:
   a folding portion foldable with respect to an imaginary folding axis extending in a first direction;
   a first non-folding portion; and
   a second non-folding portion spaced apart from the first non-folding portion in a second direction perpendicular to the first direction with the folding portion interposed therebetween, the folding portion comprising:
   a base portion; and
   a plurality of protrusion portions disposed on the base portion and spaced apart from each other in the second direction,
   wherein a width, in the first direction, of the folding portion is smaller than a width, in the first direction, of each of the first non-folding portion and the second non-folding portion.

2. The window of claim 1, wherein each of the plurality of protrusion portions comprises a protrusion edge portion substantially parallel to the second direction, each of the first non-folding portion and the second non-folding portion comprises a non-folding edge portion substantially parallel to the second direction, and the protrusion edge portion is disposed further inward than the non-folding edge portion.

3. The window of claim 2, wherein a distance, in the first direction, between the non-folding edge portion and the protrusion edge portion is equal to or greater than about 0.5 millimeter and equal to or smaller than about 100 millimeters.

4. The window of claim 1, wherein an absolute value of a difference between the width, in the first direction, of the folding portion and the width, in the first direction, of each of the first non-folding portion and the second non-folding portion is equal to or greater than about 1 millimeter and equal to or smaller than about 100 millimeters.

5. The window of claim 1, wherein a concave portion is defined in a portion corresponding to the folding portion by an edge of the folding portion, an edge of the first non-folding portion adjacent to the folding portion, and an edge of the second non-folding portion adjacent to the folding portion in a plan view, the concave portion is concaved in an inward direction, and the concave portion comprises corners adjacent to the first non-folding portion and the second non-folding portion and having a right angle shape, a U shape, or a V shape.

6. The window of claim 5, wherein a radius of curvature of the corners of the concave portion adjacent to the first non-folding portion and the second non-folding portion is equal to or greater than about 0.1 millimeter and equal to or smaller than about 2.0 millimeter when the concave portion has the U shape.

7. The window of claim 5, wherein a maximum width, in the first direction, of the concave portion is equal to or greater than about 0.5 millimeter and equal to or smaller than about 50 millimeters.

8. The window of claim 5, wherein a width, in the second direction, of the concave portion is equal to or greater than about 0.5 π millimeters and equal to or smaller than about 20 millimeters.

9. The window of claim 1, wherein each of the plurality of protrusion portions comprises:
a protrusion upper surface portion;
a protrusion lower surface portion facing the protrusion upper surface portion; and
a protrusion edge portion disposed between the protrusion upper surface portion and the protrusion lower surface portion, the protrusion edge comprising a portion perpendicular to the protrusion upper surface portion and the protrusion lower surface portion, and substantially parallel to the second direction.

10. The window of claim 9, wherein the protrusion edge portion comprises:
a protrusion vertical portion adjacent to the protrusion lower surface portion and perpendicular to the protrusion lower surface portion; and
a protrusion slant portion disposed between the protrusion vertical portion and the protrusion upper surface portion and slanted from the protrusion upper surface portion to the protrusion vertical portion.

11. The window of claim 9, wherein the protrusion edge portion comprises:
a protrusion vertical portion adjacent to the protrusion lower surface portion and perpendicular to the protrusion lower surface portion; and
a protrusion curved surface portion comprising a curved surface disposed between the protrusion vertical portion and the protrusion upper surface portion and outwardly convexed with respect to a protrusion portion of the plurality of protrusion portions.

12. The window of claim 1, wherein each of the first non-folding portion and the second non-folding portion comprises:
a non-folding upper surface portion;
a non-folding lower surface portion facing the non-folding upper surface portion; and
a non-folding edge portion disposed between the non-folding upper surface portion and the non-folding lower surface portion, the non-folding edge portion comprising a portion perpendicular to the non-folding upper surface portion and the non-folding lower surface portion, and substantially parallel to the second direction.

13. The window of claim 12, wherein the non-folding edge portion comprises:
a non-folding vertical portion adjacent to the non-folding lower surface portion and perpendicular to the non-folding lower surface portion; and
a non-folding slant portion disposed between the non-folding vertical portion and the non-folding upper surface portion and slanted from the non-folding upper surface portion to the non-folding vertical portion.

14. The window of claim 12, wherein the non-folding edge portion comprises:
a non-folding vertical portion adjacent to the non-folding lower surface portion and perpendicular to the non-folding lower surface portion; and
a non-folding curved surface portion disposed between the non-folding upper surface portion and the non-folding vertical portion and comprising a curved surface outwardly convexed with respect to at least one of the first and second non-folding portions.

15. The window of claim 1, further comprising a protrusion protective layer, wherein each of the plurality of protrusion portions comprises a protrusion edge portion substantially parallel to the second direction, and the protrusion protective layer is filled in between the plurality of protrusion portions and covers the protrusion edge portion.

16. The window of claim 15, wherein the base portion comprises a protrusion area that overlaps the plurality of protrusion portions and a non-protrusion area that does not overlap the plurality of protrusion portions, the non-protrusion area is disposed further outward than the protrusion area, and the protrusion protective layer covers the non-protrusion area.

17. The window of claim 15, wherein the protrusion protective layer covers an entirety of the plurality of protrusion portions.

18. An electronic device comprising:
a display module comprising:
a folding display portion foldable with respect to an imaginary folding axis extending in a first direction, a first non-folding display portion; and
a second non-folding display portion spaced apart from the first non-folding display portion in a second direction perpendicular to the first direction with the folding display portion interposed therebetween; and
a window disposed on the display module and comprising a folding portion corresponding to the folding display portion, a first non-folding portion, and a second non-folding portion spaced apart from the first non-folding portion with the folding portion interposed therebetween, the folding portion comprising:

a base portion and a plurality of protrusion portions disposed on the base portion and spaced apart from each other in the second direction, wherein a width, in the first direction, of the folding portion is smaller than a width, in the first direction, of each of the first non-folding portion and the second non-folding portion.

19. The electronic device of claim 18, wherein the base portion of the window is disposed adjacent to the display module.

20. The electronic device of claim 18, wherein the plurality of protrusion portions of the window is disposed adjacent to the display module.

* * * * *